US008605946B2

(12) United States Patent
Iwasaki et al.

(10) Patent No.: US 8,605,946 B2
(45) Date of Patent: Dec. 10, 2013

(54) MOVING OBJECT DETECTION APPARATUS AND MOVING OBJECT DETECTION METHOD

(71) Applicant: Panasonic Corporation, Osaka (JP)

(72) Inventors: Masahiro Iwasaki, Kyoto (JP); Kunio Nobori, Osaka (JP); Ayako Komoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/665,255

(22) Filed: Oct. 31, 2012

(65) Prior Publication Data
US 2013/0051624 A1 Feb. 28, 2013

Related U.S. Application Data

(63) Continuation of application No. PCT/JP2012/001731, filed on Mar. 13, 2012.

(30) Foreign Application Priority Data

Mar. 22, 2011 (JP) ................................ 2011-063297

(51) Int. Cl.
*G06K 9/48* (2006.01)
(52) U.S. Cl.
USPC .......................................... 382/103; 382/197
(58) Field of Classification Search
None
See application file for complete search history.

(56) References Cited

U.S. PATENT DOCUMENTS

| 8,213,681 | B2 | 7/2012 | Nobori et al. |
| 2011/0002509 | A1 | 1/2011 | Nobori et al. |
| 2011/0228987 | A1 | 9/2011 | Iwasaki et al. |
| 2011/0255747 | A1 | 10/2011 | Iwasaki et al. |
| 2011/0255748 | A1 | 10/2011 | Komoto et al. |

FOREIGN PATENT DOCUMENTS

| JP | 3-73075 | 3/1991 |
| JP | 11-66319 | 3/1999 |

(Continued)

OTHER PUBLICATIONS

International Search Report issued May 29, 2012 in International (PCT) Application No. PCT/JP2012/001731.

(Continued)

*Primary Examiner* — Stephen R Koziol
*Assistant Examiner* — Amandeep Saini
(74) *Attorney, Agent, or Firm* — Wenderoth, Lind & Ponack, LLP

(57) ABSTRACT

A moving object detection apparatus includes: a trajectory calculating unit which calculates a plurality of trajectories for each image subset; a subclass classification unit which classifies the trajectories into subclasses for each of the image subsets, an inter-subclass similarity calculating unit which calculates a trajectory share ratio which indicates the degree of sharing of the same trajectory between arbitrary two of the subclasses and calculates the similarity between the subclasses based on the share ratio; a moving object detection unit which detects the moving object in video by classifying the subclasses into classes such that the subclasses between which a higher similarity is present are more likely to be classified into the same class.

16 Claims, 27 Drawing Sheets

(56) References Cited

FOREIGN PATENT DOCUMENTS

| JP | 4763863 | 8/2011 |
|---|---|---|
| JP | 4782901 | 9/2011 |
| WO | 2010/050110 | 5/2010 |
| WO | 2010/079556 | 7/2010 |
| WO | 2011/080900 | 7/2011 |
| WO | 2011/080923 | 7/2011 |

OTHER PUBLICATIONS

Bastian Leibe et al., "Coupled Object Detection and Tracking from Static Cameras and Moving Vehicles", Pattern Analysis and Machine Intelligence, IEEE Transactions on, vol. 30, No. 10, Oct. 2008.

Gabriel J. Brostow et al., "Unsupervised Bayesian Detection of Independent Motion in Crowds", Computer Vision and Pattern Recognition, 2006 IEEE Computer Society Conference on, Jun. 2006.

Louis Kratz et al., "Tracking with Local Spatio-Temporal Motion Patterns in Extremely Crowded Scenes", Computer Vision and Pattern Recognition (CVPR), 2010 IEEE Conference on, Jun. 2010.

Vincent Rabaud et al., "Counting Crowded Moving Objects", Computer Vision and Pattern Recognition, 2006 IEEE Computer Society Conference on, Jun. 2006.

Daisuke Sugimura et al., "Using Individuality to Track Individuals: Clustering Individual Trajectories in Crowds using Local Appearance and Frequency Trait", Computer Vision, 2009 IEEE 12th International Conference on, Sep. 29-Oct. 2, 2009.

P. Anandan, "A Computational Framework and an Algorithm for the Measurement of Visual Motion", International Journal of Computer Vision, vol. 2, Jan. 1989, p. 283-310.

Vladimir Kolmogorov et al., "Computing Visual Correspondence with Occlusions via Graph Cuts", Eighth IEEE International Conference on Computer Vision, Jul. 2001.

Richard O. Duda et al., "Pattern Classification, Second edition", John Wiley & Sons, Inc., Oct. 2000, p. 526-528 and p. 550-555.

Fei Wang et al., "Label Propagation Through Linear Neighborhoods", Proceedings of the 23rd International Conference on Machine Learning, Jun. 2006.

Xiaofeng Ren et al., "Learning a Classification Model for Segmentation", Computer Vision, 2003 Ninth IEEE International Conference on, vol. 1, Oct. 2003.

E. W. Dijkstra, A note on two problems in connexion with graphs, Numerische Mathematik, Dec. 1959, p. 269-271.

Xiaofeng Ren et al., A note on two problems in connexion with graphs, Numerische Mathematik, Dec. 1959, p. 269-271.

(a) Trajectories (b) Higher-dimensional space including trajectories (c) Result of Clustering (a)  (b)

| Label | Pixel position and Pixel value | Trajectory information of pixel |
|---|---|---|
| $\theta_1$ | Pixel position and Pixel value of pixel that belongs to $\theta_1$ in image at time T | $u_t^1, v_t^1, u_{t+1}^1, v_{t+1}^1, \cdots u_{t+T}^1, v_{t+T}^1$ |
| $\theta_2$ | Pixel position and Pixel value of pixel that belongs to $\theta_2$ in image at time T | $u_t^2, v_t^2, u_{t+1}^2, v_{t+1}^2, \cdots u_{t+T}^2, v_{t+T}^2$ |

MOVING OBJECT DETECTION APPARATUS AND MOVING OBJECT DETECTION METHOD

CROSS REFERENCE TO RELATED APPLICATIONS

This is a continuation application of PCT Patent Application No PCT/JP2012/001731 filed on Mar. 13, 2012, designating the United States of America, which is based on and claims priority of Japanese Patent Application No. 2011-063297 filed on Mar. 22, 2011. The entire disclosures of the above-identified applications, including the specifications, drawings and claims are incorporated herein by reference in their entirety.

FIELD

One or more exemplary embodiments disclosed herein relate generally to image processing techniques of detecting a moving object by identifying a region of the moving object in an image, and particularly to a moving object detection apparatus and the like which detect and extract a moving object based on motion information in video under the circumstance in which occlusion is likely to occur.

BACKGROUND

Research and development on a region extraction technique with which a moving object is detected by extracting a region of the moving object in an image from the image including an image of the moving object (hereinafter referred simply to as "moving object") have been widely carried out. The technique of extracting the region of a moving object is a basic technique commonly used for: focus control and image quality improvement processing in a digital video camera or a digital still camera; a driving safety support system for vehicles; or a collision avoidance control or an alarm for avoiding collision which are used for a robot to avoid collision against a moving object.

Among techniques for detecting a moving object in an image, a method generally used is learning information on a shape of the moving object in advance; performing matching between the learnt information on a shape and a region in the image while scanning the image; and extracting a region with a high degree of matching as an object to be detected, as described in Non Patent Literature 1, for example.

In addition, Non Patent Literatures 2 to 5 disclose a method of tracking a moving object in a crowded scene in which occlusion is likely to occur, Unlike Non Patent Literature 1, these methods extract trajectories from video without using the information on a shape, and perform clustering on each of the trajectories based on the similarity of the trajectories, thereby allowing extracting, as classes, moving objects each having a different motion and tracking the extracted moving objects. It is effective, in particular, for tracking of an occluded object which is difficult to be extracted with the moving object extracting method in which information on a shape is used.

CITATION LIST

Non Patent Literature

[Non Patent Literature 1] B. Leibe, K. Schindler, N. Cornellis and L. Van Gool, "Coupled Object Detection and Tracking From Static Cameras and Moving Vehicles", IEEE Trans. Pattern Recognition and Machine Intelligence Vol. 30, No, 10, 1683-1698, 2008

[Non Patent Literature 2] G. J. Brostow and R. Cipolla, "Unsupervised Bayesian Detection of Independent Motion in Crowds", In Proc. of IEEE Conference on Computer Vision and Pattern Recognition, 2006

[Non Patent Literature 3] L. Kratz and K. Nishino, "Tracking with Local Spatio-temporal Motion Patterns in Extremely Crowded Scenes", In Proc. of IEEE Conference on Computer Vision and Pattern Recognition, 2010

[Non Patent Literature 4] V. Rabaud and S. Belongie, "Counting Crowded Moving Objects", In Proc. of IEEE Conference on Computer Vision and Pattern Recognition, 2006

[Non Patent Literature 5] D. Sugimura, K. Kitani, T. Okabe, Y. Sato, and A. Sugimoto, "Using Individuality to Track Individuals: Clustering Individual Trajectories in Crowds using Local Appearance and Frequency Trait", In Proc. of International Conference on Computer Vision, 2009

SUMMARY

Technical Problem

However, according to the method described in above-described Non Patent Literature 1, the information on a shape of a moving object is only partly visible in such a scene as in a crowded environment, and so on, in particular, in which occlusion is likely to occur, leading to decrease in the degree of matching, and thus it is difficult to detect an object to be detected.

In addition, since the focus is not on region extraction but on tracking a moving object, the technique of tracking a moving object in a crowded scene as represented by Non Patent Literatures 2 to 5 described above is based on the assumption of a scene in which part of the moving object is not occluded for a long period of time. This means that this method is available only when it is possible to track the moving object without occlusion of part of the moving object, Therefore, the technique can be used limitedly for a panoramic scene captured by a camera located in a high position, and the like.

In view of the above, one non-limiting and exemplary embodiment provides a moving object detection apparatus and a moving object detection method which solve the difficulty of a capturing position with limitation and an erroneous detection of a camera, and are capable of properly detecting and extracting a moving object even under the circumstance in which occlusion is likely to occur.

Solution to Problem

In one general aspect, the techniques disclosed here feature a moving object detection apparatus which detects a moving object in video by performing segmentation to identify an entire or partial region of the moving object in the video, the moving object detection apparatus including: an image input unit configured to receive at least three pictures included in the video; a trajectory calculating unit configured to (i) extract, from among the at least three pictures, image subsets each including at least two of the pictures, and (ii) calculate, for each of the image subsets, trajectories each of which is a trajectory of motion of a block, between the pictures included in the image subset, the block including one or more pixels and being included in each of the pictures; a subclass classification unit configured to classify, for each of the image subsets, the trajectories into subclasses, the trajectories being included in the image subset and calculated by the trajectory calculating unit; an inter-subclass similarity calculating unit configured to (i) calculate a trajectory share ratio which indicates a degree of sharing a same trajectory between two of the subclasses, and (ii) calculate a similarity between the two of the subclasses based on the trajectory share ratio; and a moving object detection unit configured to detect the moving object in the video by classifying the subclasses into classes such that the subclasses between which the similarity calculated by the inter-subclass similarity calculating unit is higher are more likely to be classified into the same class, to identify, as the region of a moving object, the blocks which correspond to the trajectories included in a same class.

These general and specific aspects may be implemented using a system, a method, an integrated circuit, a computer program, or a computer-readable recording medium, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

One or more exemplary embodiments or features disclosed herein provide the moving object detection apparatus and the moving object detection method which solve the difficulty of limited capturing position and an erroneous detection of a camera, and are capable of properly detecting and extracting a moving object even under the circumstance in which occlusion is likely to occur.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 22 is a diagram which illustrates an example of data to be recorded and transmitted according to the first modification of Embodiments 1 to 4.

DESCRIPTION OF EMBODIMENTS (Underlying Knowledge Forming Basis of the Present Disclosure)

In relation to the Non Patent Literatures disclosed in the Background Art section, the inventors have found the following problem.

Figure 1A:
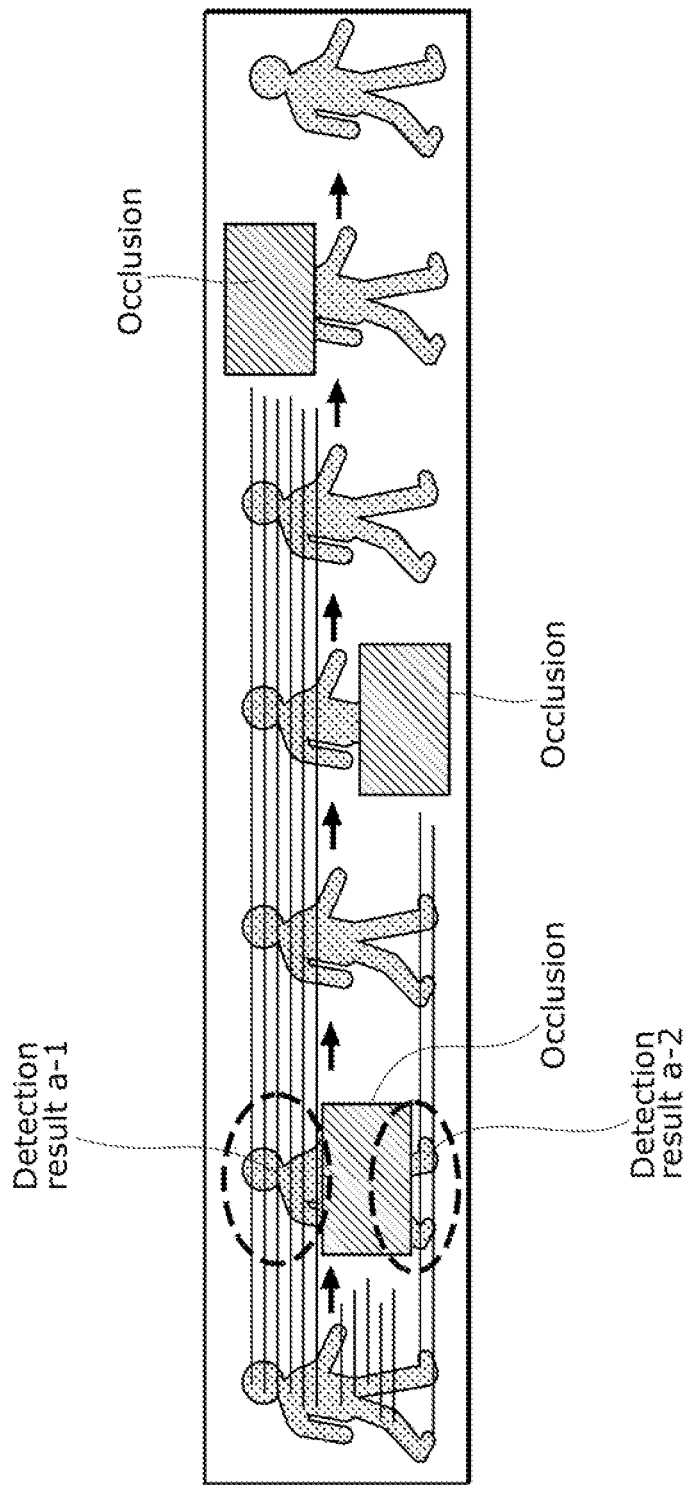
FIG. 1A is a diagram which illustrates the difficulty in long-term tracking.
Figure 1B:
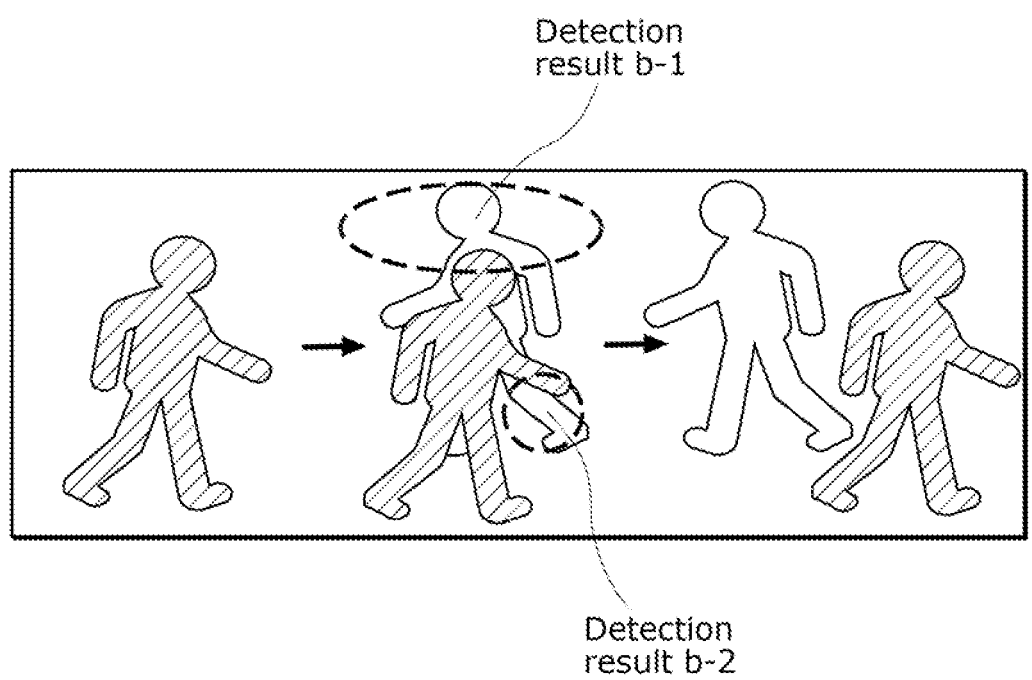
FIG. 1B is a diagram which illustrates the difficulty in long-term tracking.

Many on-vehicles cameras or mobile cameras are used, in many cases, for capturing images from a relatively low position. When capturing a crowded scene from a low position, in particular, a moving object positioned behind is more likely to be occluded by a moving object positioned in front, compared to a panoramic scene captured from a high position. Therefore, tracking a moving object for a long period of time is found to be difficult under the circumstance in which occlusion by guardrails or other objects is likely to occur, as shown in FIG. 1A and FIG. 1B, Meanwhile, it is found that an erroneous detection occurs in such cases as those illustrated in FIG. 1A and FIG. 1B when the technique of tracking a moving object is applied using motion information of a short period of time. It is found that, when part of a moving object is temporarily occluded by a guardrail, a person, or the like, for example, a head region and a leg region are extracted as different moving objects as illustrated by detection results a-1 and a-2 and detection results b-1 and b-2, and an erroneous detection occurs with which a moving object that is originally a single moving object is detected as two moving objects. In FIG. 1A, for example, in the case where trajectories are calculated for a long period of time, some of the trajectories disappear after occlusion occurs. It is therefore found that trajectories cannot be calculated when occlusion sequentially occurs in a waist region, the leg region, the head region, and so on. It is thus found that trajectories cannot be calculated densely when the trajectories are calculated for a long period of time.

In order to solve the above-described points, according to an exemplary embodiment disclosed herein, a moving object detection apparatus which detects a moving object in video by performing segmentation to identify an entire or partial region of the moving object in the video, the moving object detection apparatus includes: an image input unit configured to receive at least three pictures included in the video; a trajectory calculating unit configured to (i) extract, from among the at least three pictures, image subsets each including at least two of the pictures, and (ii) calculate, for each of the image subsets, trajectories each of which is a trajectory of motion of a block, between the pictures included in the image subset, the block including one or more pixels and being included in each of the pictures; a subclass classification unit configured to classify, for each of the image subsets, the trajectories into subclasses, the trajectories being included in the image subset and calculated by the trajectory calculating unit; an inter-subclass similarity calculating unit configured to (i) calculate a trajectory share ratio which indicates a degree of sharing a same trajectory between two of the subclasses, and (ii) calculate a similarity between the two of the subclasses based on the trajectory share ratio; and a moving object detection unit configured to detect the moving object in the video by classifying the subclasses into classes such that the subclasses between which the similarity calculated by the inter-subclass similarity calculating unit is higher are more likely to be classified into the same class, to identify, as the region of a moving object, the blocks which correspond to the trajectories included in a same class.

According to the configuration described above, trajectories are calculated for each of the image subsets. As described above, the trajectories are calculated at a short time interval, and thus it is possible to calculate dense trajectories in each of the image subsets. Such dense trajectories are classified into subclasses, and the similarity between the subclasses is calculated based on a share ratio, thereby making it possible to properly detect a moving object even when occlusion occurs. For example, even when the trajectories classified into the first subclass in the first image subset are separated into the second subclass and the third subclass in the second image subset in the next time period due to the effect of occlusion, the share ratio between the first subclass and the second subclass and the share ratio between the first subclass and the third subclass are both high. Accordingly, by performing the classification on the subclasses using the similarity between the subclasses which is calculated based on the share ratio, the first to the third subclasses are classified into the same class and detected as the same moving object. Thus, it is possible to solve the difficulty of limited capturing position and an erroneous detection of a camera, and properly detect and extract a moving object even under the circumstance in which occlusion is likely to occur.

For example, the subclass classification unit may include a subclass label assigning unit configured to (i) classify, for each of the image subsets, the trajectories which are included in the image subset and calculated by the trajectory calculating unit, into the subclasses, and (ii) assign, to each of the trajectories, a subclass label that is an identifier of a corresponding one of the subclasses into which the trajectory is classified, the inter-subclass similarity calculating unit may include a label propagation unit configured to propagate the subclass label between the subclasses by (i) calculating the trajectory share ratio which indicates a degree of sharing a trajectory indicating motion of a same block between a first subclass and a second subclass which are arbitrarily selected from among all of the subclasses, and (ii) reassigning the subclass label such that the first subclass and the second subclass between which the trajectory share ratio is higher are more likely to be reassigned with the same subclass label, and the moving object detection unit may detect the moving object in the video by classifying, into the same class, the subclasses to which the same subclass label is assigned, to identify, as the region of the moving object, the blocks which correspond to the trajectories included in the same class.

According to the configuration described above, trajectories are calculated for each of the image subsets. As described above, the trajectories are calculated at a short time interval, and thus it is possible to calculate dense trajectories in each of the image subsets. Such dense trajectories are classified into subclasses, and the subclass label is propagated between the subclasses based on the share ratio, thereby making it possible to properly detect a moving object even when occlusion occurs. For example, even when the trajectories classified into the first subclass in the first image subset are separated into the second subclass and the third subclass in the second image subset in the next time period due to the effect of occlusion, the share ratio between the first subclass and the second subclass and the share ratio between the first subclass and the third subclass are both high. The process of propagation of the subclass label allows the same subclass label to be reassigned to the first to the third subclasses, and thus the first to the third subclasses are detected as the same moving object. Thus, it is possible to solve the difficulty of limited capturing position and an erroneous detection of a camera, and properly detect and extract a moving object even under the circumstance in which occlusion is likely to occur.

More specifically, compared to the conventional trajectory clustering methods, trajectories which are temporally shorter are classified into subclasses, the subclass label obtained using, as a trajectory share ratio, the strength of temporal relation between the subclasses is propagated, and the subclass label having a temporally strong relation is updated to the same class label, thereby allowing region extraction while temporally maintaining coherence. It is therefore possible to determine a moving object which is temporally separated into two objects as one moving object, and assign the same label, thereby producing an advantageous effect that erroneous detection is prevented in detecting a moving object, In addition, since temporally short trajectories are used, it is possible to reduce the risk that a corresponding point disappears in a scene in which occlusion frequently occurs and trajectories cannot be calculated. It is therefore possible to extract a moving object with higher density and improve the accuracy in detection. In addition, it is possible not only to detect a moving object but to extract a moving object from an image, In addition, the trajectory calculating unit may (i) extract the image subsets from among the at least three pictures such that some of the pictures are shared between temporally adjacent image subsets, and (ii) calculate, for each of the image subsets, trajectories each of which is a trajectory of motion of a block, between the pictures included in the image subset, the block including one or more pixels and being included in the pictures, and the label propagation unit may propagate the subclass label between the subclasses by (i) determining that the trajectory share ratio between the first subclass and the second subclass is higher as a ratio of a trajectory passing a same position in the pictures shared between the first subclass and the second subclass to the trajectories included in the first subclass and the second subclass is higher, and (ii) reassigning the subclass label such that the first subclass and the second subclass between which the trajectory share ratio is higher are more likely to be reassigned with the same subclass label.

The image subsets are extracted such that pictures are shared between the temporally adjacent image subsets. With this, the trajectories for the pictures shared between temporally adjacent image subsets are the same. It is therefore possible to easily calculate the share ratio between the first subclass and the second subclass, In addition, the label propagation unit may further propagate the subclass label between the subclasses by performing reassigning such that the same subclass label as the subclass label assigned by the subclass label assigning unit is more likely to be reassigned to the subclass which is higher in reliability that is a value corresponding to the number of trajectories included in the subclass or a spatial size of a region including trajectories included in the subclass.

It is possible to perform segmentation having temporal coherence with higher accuracy, by using the subclass reliability. It is therefore possible to correctly perform region extraction on the moving object, and thus the moving object in an image can be reliably detected.

In addition, the moving object detection apparatus may further include: a holding unit configured to hold, from among the trajectories calculated by the trajectory calculating unit, trajectories which are calculated using fewer pictures than the pictures included in the image subset; and a trajectory recovery unit configured to classify the trajectories held in the holding unit into a same class as a class to which other trajectories continuous to the trajectories held in the holding unit belong, wherein the moving object detection unit may further detect the moving object in the video by identifying, as the region of the moving object, blocks which correspond to the trajectories included in the same class, the trajectories including the trajectories classified by the trajectory recovery unit.

The trajectories which are not used in generating the subclass are classified into the class to which other trajectories continuous to the trajectories which are not used belong, thereby allowing extraction of a moving object with higher density.

In addition, the subclass label assigning unit may classify, for each of the image subsets, the trajectories which are included in the image subset and calculated by the trajectory calculating unit, into subclasses by classifying similar trajectories from among the trajectories into the same subclass, and assign, to each of the trajectories, a subclass label which is an identifier of the subclass into which the trajectory is classified. More specifically, the subclass label assigning unit may classify, for each of the image subsets, the trajectories into the subclasses, by performing a process of classifying, into a same subclass, a combination of most similar trajectories from among the trajectories which are included in the image subset and calculated by the trajectory calculating unit, repeatedly for predetermined times or until the trajectories are classified into a predetermined number of subclasses, and assign, to each of the trajectories, a subclass label which is an identifier of the subclass into which the trajectory is classified.

With this, it is possible to classify similar trajectories into the same subclass.

In addition, the subclass label assigning unit may (i) classify the trajectories calculated by the trajectory calculating unit into subclasses, by (a) calculating a distance that indicates the similarity between the trajectories, (b) combining, from among the calculated distances, distances each of which is shorter than a predetermined threshold, to transform the calculated distances into geodetic distances, and (c) calculating, for each of the image subsets, a geodetic distance of two arbitrary trajectories from among the trajectories which are included in the image subset and calculated by the trajectory calculating unit, detecting a discontinuity point in a distribution of the obtained geodetic distances, sorting out, as one cluster, trajectories which are spaced apart from each other by the geodetic distance shorter than the detected discontinuity point, to classify the trajectories into subclasses, and (ii) assign, for each of the trajectories, a subclass label that is an identifier of the subclass into which the trajectory is classified, the geodetic distance being a distance of a path that passes through, as a relay point, a trajectory other than the arbitrary two trajectories, from one of the two trajectories to the other.

As described above, the geodetic distance between trajectories is used in order to indicate the similarity between the trajectories, and thus it is possible to detect and extract a moving object with higher accuracy for an articulated object such as a person.

In addition, as to the method of generating a subclass, another example is that the subclass label assigning unit is configured to divide, for each of the image subsets, at least one image into a plurality of regions, using at least one of edge, color, and brightness of the at least one image, to generate subclasses, and assign a subclass label to each of the trajectories that pass through the regions resulting from the division, the at least one image being included in the image subsets.

As described above, it is also possible to classify the trajectories into subclasses, using spatial information of an image, such as edge, brightness, color, and so on.

In addition, the moving object detection apparatus may further include an output unit configured to perform image processing on at least one of the pictures received by the image input unit, such that each of moving object region classified into the same class by the moving object detection unit is displayed in a display mode different from a display mode of other moving object regions, and output the picture on which the image processing is performed.

With this, it is possible to display the extracted moving object on an image, using AV (Audio/Visual) devices, image monitoring devices, and so on, This allows a user to easily recognize the moving object.

In addition, the moving object detection apparatus may further include a recording and transmitting unit configured to write or transmit a result of detecting a moving object performed by the moving object detection unit, into a recording device or to an external device via a transmission path, respectively.

With this, by selecting only a necessary moving object image from among the moving object images, to store or output the selected image to an external device, it is possible to efficiently store and output images as pictorial elements, for example. Thus, this is effective in the case of storing and transmitting a moving object image to a device having a limited processing capacity such as a cellular phone.

In addition, the moving object detection apparatus may further include a motion prediction unit configured to calculate, from among the trajectories which are identified by the moving object detection unit and included in the class, a representative trajectory that represents the class, and predict, according to the calculated representative trajectory, motion of the moving object by predicting that a region of the moving object corresponding to the class moves between the pictures.

By predicting the motion of the moving object using the representative trajectory of a plurality of blocks, it is possible to perform motion prediction that is highly resistant to noise.

In addition, the inter-subclass similarity calculating unit may calculate a similarity between the subclasses by repeatedly multiplying a matrix W in which each of elements indicates the trajectory share ratio between the subclasses, by a matrix Z in which each of the elements indicates the similarity between the subclasses, to update the matrix Z in which each of the elements indicates the similarity between the subclasses.

Since the similarity between the subclasses can be calculated by performing multiplication between matrices, it is possible to calculate the similarity between the subclasses at high speed.

In addition, the inter-subclass similarity calculating unit may further calculate the similarity between the subclasses by weighting the updated matrix Z with a matrix Y in which each of the elements indicates a subclass reliability that is a value corresponding to the number of trajectories included in the subclass or a spatial size of a region including trajectories included in the subclass.

The similarity between the subclasses is calculated by adding the subclass reliability, and thus it is possible to increase the reliability of the similarity between the subclasses.

These general and specific aspects may be implemented using a system, a method, an integrated circuit, a computer program, or a computer-readable recording medium, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements, Embodiment 1

The following describes, with reference to the drawings, exemplary embodiments according to the present disclosure.

Figure 2:
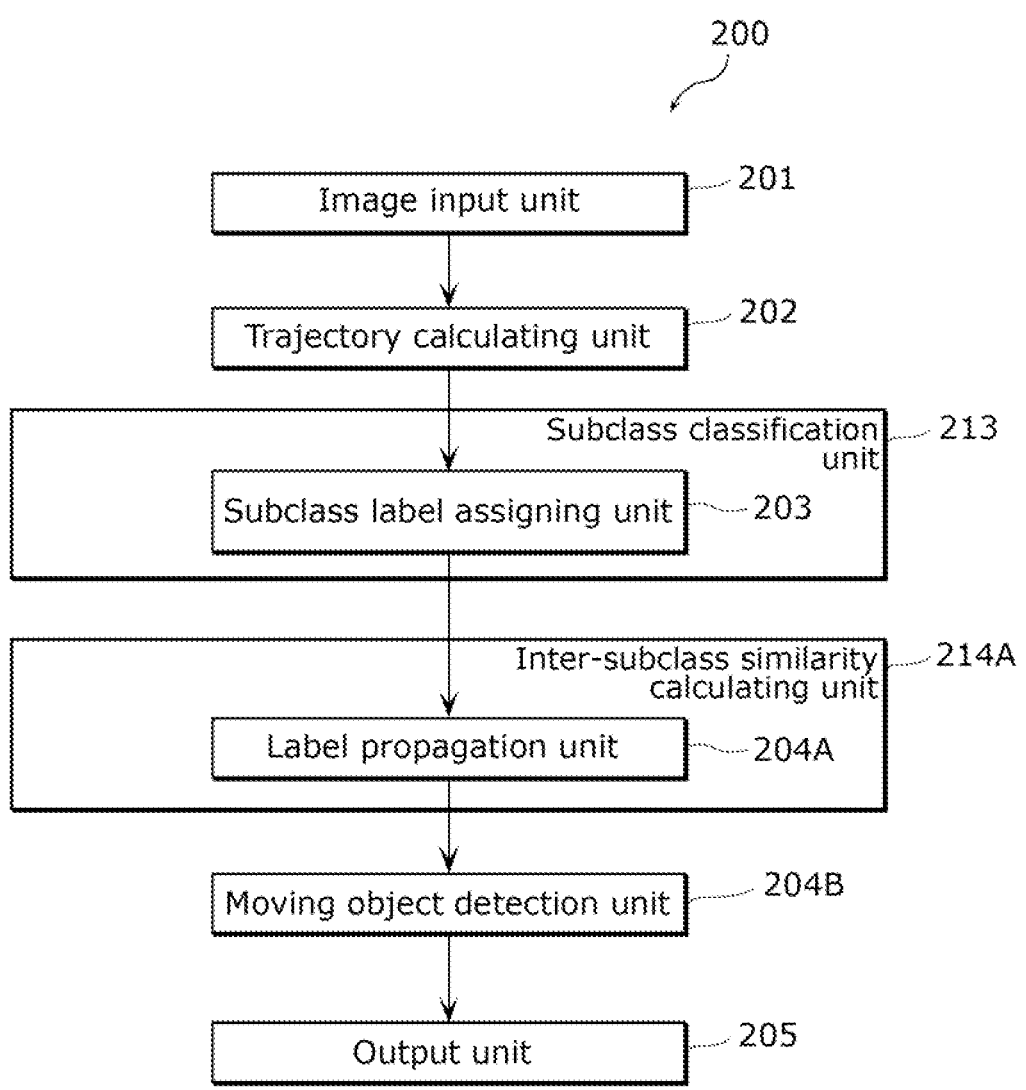
FIG. 2 is a diagram which illustrates a basic configuration of a moving object detection apparatus according to Embodiment 1.

FIG. 2 is a diagram which illustrates a configuration of a moving object detection apparatus according to Embodiment 1. As shown in FIG. 2, a moving object detection apparatus 200 includes: an image input unit 201, a trajectory calculating unit 202, a subclass classification unit 213, an inter-subclass similarity calculating unit 214A a moving object detection unit 204B, and an output unit 205.

The moving object detection apparatus 200 is an apparatus which detects a moving object in video by performing classification, using trajectories, to identity an entire or partial region of the moving object in the video. More specifically, the moving object detection apparatus 200 is an apparatus which detects a moving object in the video by performing segmentation to identify an entire or partial region of the moving object in the video.

The image input unit 201 is a processing unit which receives input of temporally different pictures included in the video, and is, for example, a video camera or a communication interface connected to the video camera, or the like. More specifically, the image input unit 201 receives at least three pictures included in the video. Hereinafter, the picture is also referred to as the image.

The trajectory calculating unit 202 divides, into image subsets, the at least three pictures which are received by the image input unit 201. Here, each of the image subsets is assumed to include at least two of the pictures. Then, the trajectory calculating unit 202 calculates a trajectory for each of the image subsets. The trajectory calculating unit 202 calculates a trajectory by detecting motion of an image between at least two pictures, for each block that (i) includes one or more pixels and (ii) is included in each of the pictures, and concatenating the detected motions over more than one picture. To be specific, a block is a unit for calculating a trajectory and a group of one or more pixels. More specifically, the trajectory calculating unit 202 (i) extracts, from among pictures, image subsets each composed of at least two of the pictures, and (ii) calculates, for each of the image subsets, trajectories each of which is a trajectory of the motion, between the pictures included in the image subset of a block including one or more pixels and included in the pictures.

The subclass classification unit 213 classifies, for each of the image subsets, the trajectories which are calculated by the trajectory calculating unit 202 and included in the image subset, into subclasses. The subclass classification unit 213 includes a subclass label assigning unit 203. The subclass label assigning unit 203 (i) classifies, for each of the image subsets, the trajectories which are calculated by the trajectory calculating unit 202 and included in the image subset, into subclasses, and (ii) assigns, to each of the trajectories, a subclass label that is an identifier of a corresponding one of the subclasses into which the trajectory is classified.

The inter-subclass similarity calculating unit 214A (i) calculates a trajectory share ratio which indicates the degree of sharing of the same trajectory between arbitrary two subclasses, and (ii) calculates the similarity between the subclasses based on the share ratio. The inter-subclass similarity calculating unit 214A includes a label propagation unit 204A. The label propagation unit 204A (i) calculates the trajectory share ratio which indicates the degree of sharing of the same trajectory (trajectory that indicates a motion of the same block) between the first subclass and the second subclasses which are arbitrarily selected from among all of the subclasses, and (ii) propagates the subclass label between the subclasses, by performing reassigning such that the same subclass label is more likely to be reassigned to the first subclass and the second subclass as the calculated share ratio is higher. Thus, the label propagation unit 204A uses the trajectory share ratio as the similarity (the strength of temporal relation) of an arbitrary subclass pair, to propagate label information of the subclass between the subclasses, it is to be noted that the trajectory share ratio is a ratio of holding the same trajectory between the subclasses. The details thereof will be described later. Here, the label information of the subclasses is updated based on the results of propagating the label information of the subclasses. This means that subclasses to which the same subclass label is assigned indicate a high similarity between the subclasses, The moving object detection unit 204B identifies, as a region of a moving object, blocks which correspond to the trajectories included in the same class, by classifying the subclasses into classes such that the subclasses between which a higher similarity is present which is calculated by the inter-subclass similarity calculating unit 214A are more likely to be classified into the same class, thereby detecting the moving object in the video.

The same subclass label is assigned to two subclasses between which a high similarity is present. Thus, the moving object detection unit 204B identifies, as a region of a moving object, blocks which correspond to the trajectories included in the same class, by classifying, into the same class, the subclasses to which the same subclass label is assigned, thereby detecting the moving object in the video.

More specifically, the moving object detection unit 204B determines that subclasses to which the same subclass label is assigned as a result of the update of the label information are classified into the same class. As described above, the moving object detection unit 2048 determines whether or not the subclasses obtained from each of the image subsets are classified into the same class, thereby performing clustering having temporal coherence. This allows the same class label to be assigned to the trajectories which belong to the subclasses that are determined as being classified into the same class. As a result, since one class corresponds to one moving object, it is possible to identify a region of the moving object when the trajectories can be classified into the respective classes, and thus it is possible to detect the moving object. Here, a class is a group of one or more subclasses, and the subclasses which belong to the same class correspond to the same moving object.

The output unit 205 outputs the result of detecting the moving object in the video performed by the moving object detection unit 240B, More specifically, the output unit 205 performs image processing on at least one picture among the pictures received by the image input unit 201, such that each of moving object region classified into the same class by the moving object detection unit 204B is displayed in a display mode different from a display mode of other moving object regions, and outputs the picture on which the image processing is performed. It is to be noted that the output unit 205 outputs the picture on which the image processing is performed, to a display apparatus or the like.

It is to be noted that the term "segmentation" as referred to in the present specification includes both of (i) a detection technique of extracting an image region in which a particular target object is present, and (ii) a classification technique of classifying image regions (trajectories) for each object irrespective of the target. It is to be noted that the detection technique and the classification technique have much in common, and therefore are not distinguished from each other in the present specification.

Figure 3:
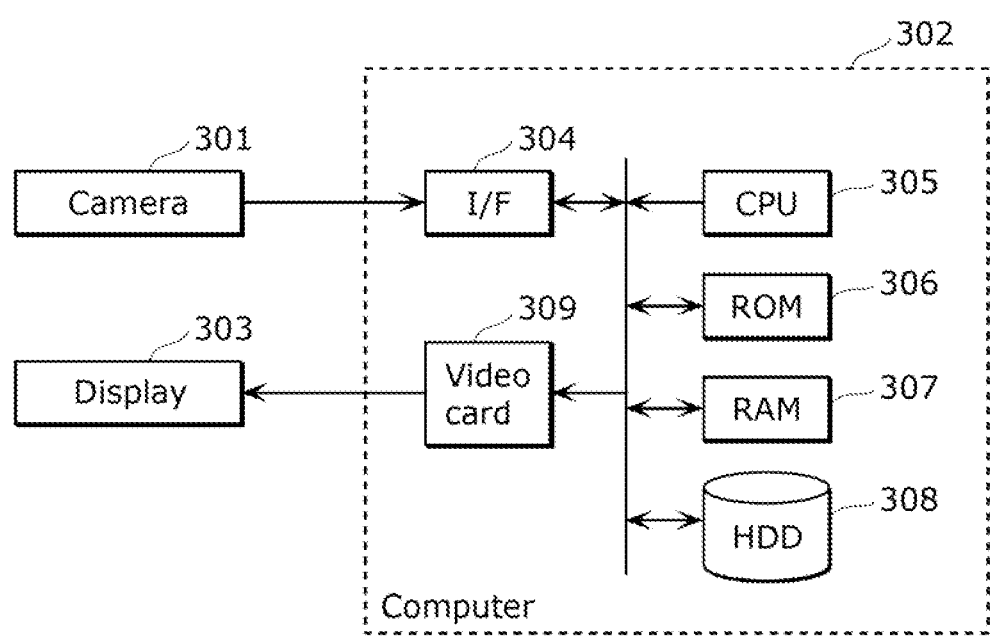
FIG. 3 is a configuration diagram of hardware which executes software in the case where the moving object detection apparatus according to Embodiment 1 is realized using the software.

It is to be noted that each of the structural elements included in the above-described moving object detection apparatus 200 (the image input unit 201, the trajectory calculating unit 202, the subclass label assigning unit 203, the label propagation unit 204A, the moving object detection unit 204B, and the output unit 205) may be realized by software such as a program executed on a computer, or may be configured in the form of a hardware product, such as an electronic circuit and an integrated circuit. FIG. 3 is a diagram which shows a hardware configuration of the moving object detection apparatus realized by software according to this exemplary embodiment, In FIG. 3, a camera 301 captures an image and outputs the captured image. A computer 302 obtains the image from the camera 301, performs a moving object detection process on the obtained image, and then generates an image for displaying the result of the moving object detection. A display 303 obtains and displays the image generated by the computer 302. The computer 302 includes, an I/F 304, a CPU 305, a ROM 306, a RAM 307, an HDD 308, and a video card 309. A program causing the computer 302 to operate is previously held by the ROM 306 or the HDD 308. The program is read out from the ROM 306 or HDD 308 to the RAM 307 by the CPU 305 that is a processor, to be developed. The CPU 305 executes each coded instruction in the program developed by the RAM 307. The I/F 304 retrieves, into the RAM 307, the image captured by the camera 301 according to the execution of the program. The video card 309 outputs the generated image according to execution of the program, and the display 303 displays the image.

It is to be noted that the computer program may be stored on, for example, an optical disc, without being limited to the ROM 306 or HDD 308 that is a semiconductor. In addition, the computer program may also be transmitted via a wired or wireless network, broadcasting, and so on, and may be retrieved into the RAM 307 in the computer, The following describes an operation of the moving object detection apparatus 200 according to this exemplary embodiment, with reference to FIG. 4.

Figure 4:
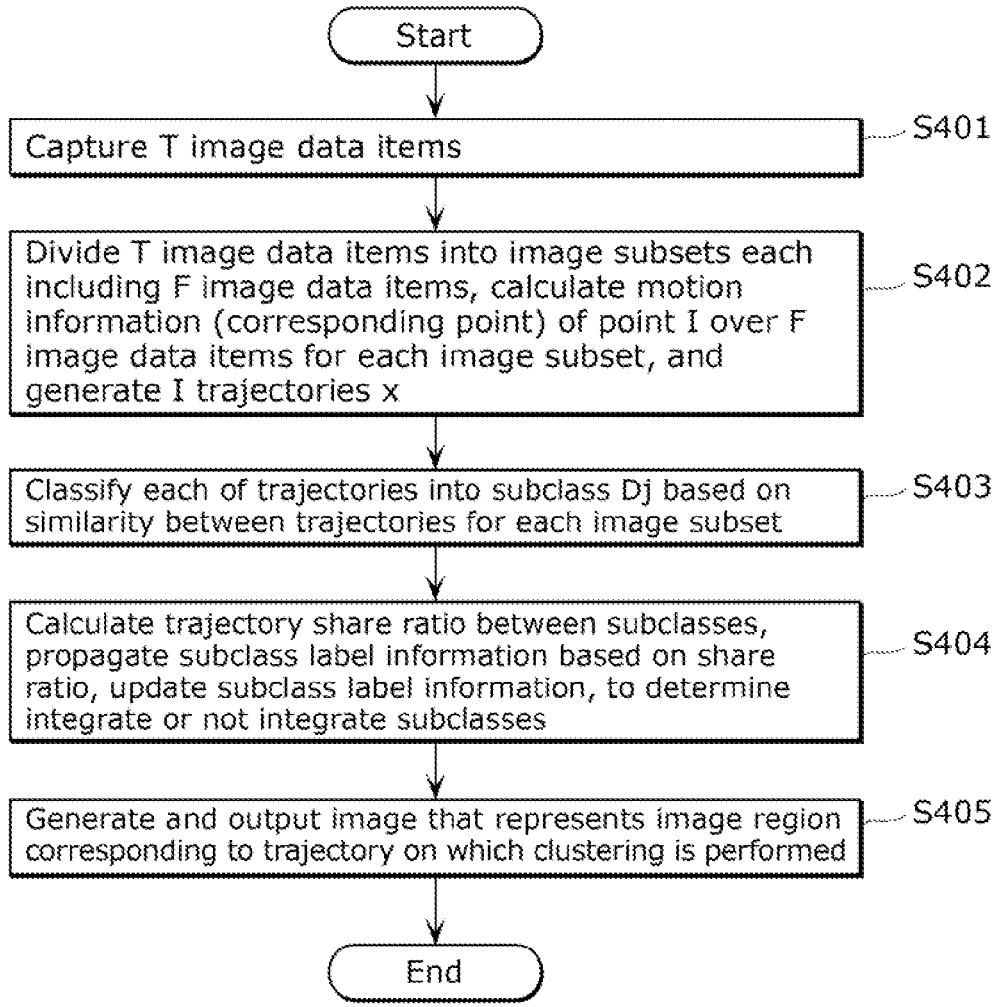
FIG. 4 is a flowchart which illustrates a basic operation of the moving object detection apparatus according to Embodiment 1.

FIG. 4 is a flowchart that shows an operation performed by the moving object detection apparatus 200 according to this exemplary embodiment.

In FIG. 4, Step S401, Step S402, and Step S403 correspond to the image input unit 201, the trajectory calculating unit 202, and the subclass label assigning unit 203, respectively, in FIG. 2, In addition, Step S404 corresponds to the label propagation unit 204A and the moving object detection unit 204B in FIG. 2, Furthermore, Step S405 corresponds to the output unit 205 in FIG. 2. To be more specific, the image input unit 201 performs the operation of an image inputting step S401, the trajectory calculating unit 202 performs the operation of a trajectory calculating step S402, the subclass label assigning unit 203 performs the operation of a subclass label assigning step S403, the label propagation unit 204A and the moving object detection unit 204B perform the operation of a label propagation and update step S404, and the output unit 205 performs the operation of image outputting step S405.

In the image inputting step S401, the image input unit 201 obtains, from the camera 301, a plurality of pictures included in video, Here, it is assumed that T (T≥3) pictures are received.

Figure 5A:
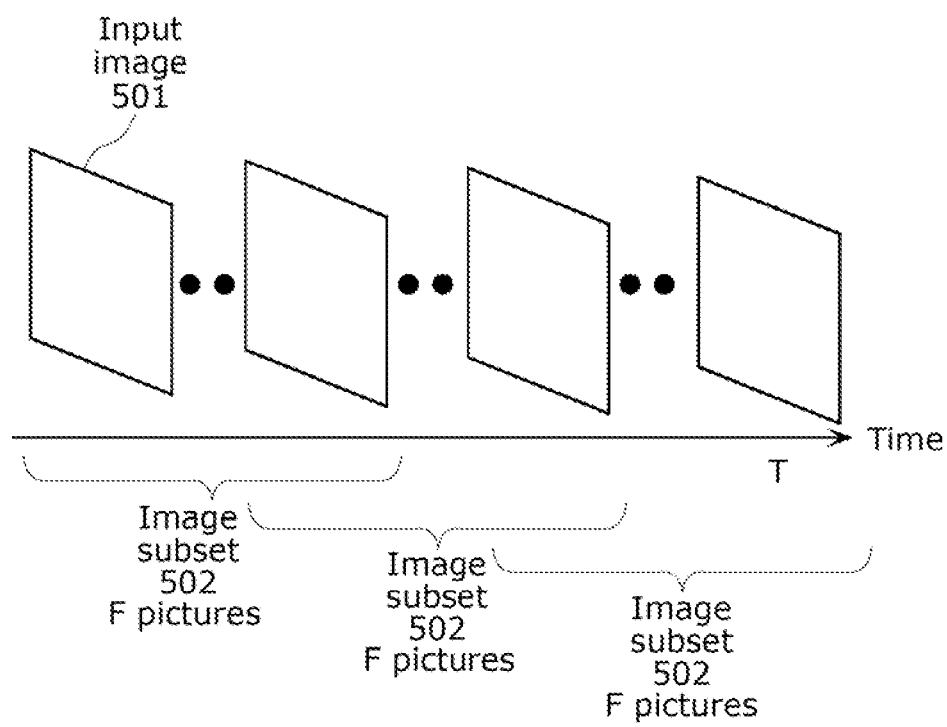
FIG. 5A is a diagram which illustrates a processing example of a method of dividing video into image subsets according to Embodiment 1.
Figure 5B:
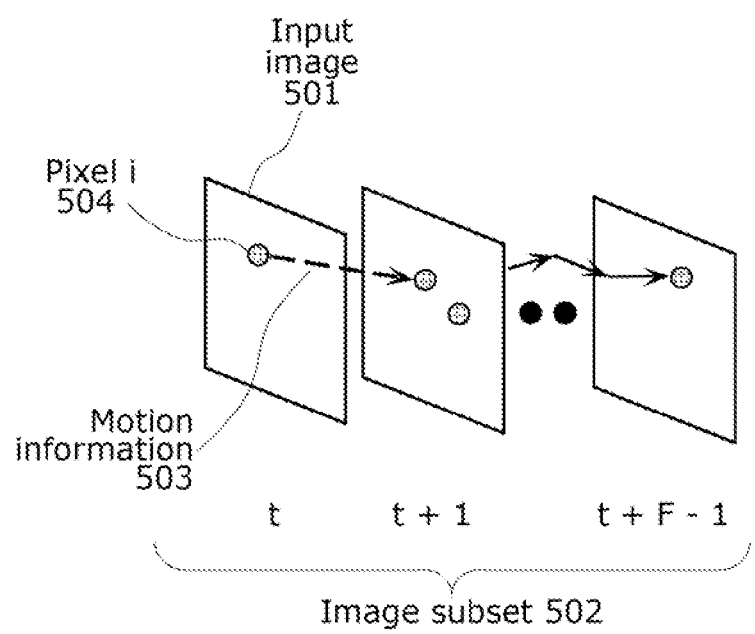
FIG. 5B is a diagram which illustrates an example of processing performed by a trajectory calculating unit according to Embodiment 1.

Next, in the trajectory calculating step S402, the trajectory calculating unit 202 divides T pictures received by the image input unit 201 into temporally sequential D image subsets, each of which includes F (F≥2) pictures, Here, it is to be noted that T>F, For example, the trajectory calculating unit 202 divides the pictures into image subsets 502 such that a picture of the same time is shared between adjacent image subsets as shown in FIG. 5A. Then, the trajectory calculating unit 202 calculates a trajectory for each of the image subsets. Here, as shown in FIG. 5B, the trajectory calculating unit 202 calculates motion information 503 between the pictures included in each of the image subsets 502, generates a trajectory, and outputs the generated trajectory. As a method of calculating motion between plural pictures, based on a pixel 1504 at a point I on one of the plural pictures, other (F-1) pictures are searched for a pixel corresponding to the pixel 1504. It is to be noted that I small rectangular regions (blocks) may be based on instead of the pixel at the point I. For example, the trajectory calculating unit 202 predicts, using pictures captured at time t and time t(t+1), a pixel coordinate $(x_{it+1}, y_{it+1})$ on a picture at time (t+1) which corresponds to a pixel coordinate $(x_{it}, y_{it})(i=1 \ldots I)$ of the pixel i on the picture at time t. In the case where three or more pictures are included, a corresponding point of the point I in F pictures included in each of the image subsets is calculated by sequentially calculating corresponding coordinates.

A detailed explanation for the specific method of calculating the corresponding point between the plural pictures described above is omitted here as described in detail in Non Patent Literature 6, Non Patent Literature 7, and so on.

It is to be noted that it is sufficient that T is three or more and F is two or more in this exemplary embodiment. In addition, as to the image subsets, T pictures need not necessarily be divided such that a picture of the same time is shared between adjacent image subsets as in the example of FIG. 5A. The pictures may be divided without being shared, in such a manner as in pictures from time (t+1) to time (t+F) are included in one image subset and pictures from time (t+F+n) to time (t+2F-1+n) are included in one image subset. When the pictures are divided without sharing of a picture of the same time between the image subsets as described above, the trajectory calculating unit 202 performs inter-block matching between the image at time (t+F) and the image at time (t+F+n) which are images between the image subsets, thereby calculating a corresponding point between the two images.

[Non Patent Literature 6] P. Anandan, "A Computational Framework and an Algorithm for the Measurement of Visual Motion", International Journal of Computer Vision, Vol. 2, pp. 283-310, 1989

[Non Patent Literature 7] Vladimir Kolmogorov and Ramin Zabih, "Computing Visual Correspondence with Occlusions via Graph Cuts", International Conference on Computer Vision, 2001

Then, in the trajectory calculating step S402, the trajectory calculating unit 202 generates, for each of the image subsets, I trajectories corresponding to the respective pixels, from sets of pixel coordinates for corresponding points which indicate motion information of pixels at I points over F pictures, as shown in Expression 1 below.

The following describes an example of calculating trajectories for one image subset.

[Math. 1]

$$x^i = (x_1^i, y_1^i, \ldots, x_f^i, y_f^i, \ldots, x_F^i, y_F^i) \quad \text{Expression 1}$$

Here, F denotes the number of pictures included in the image subset; that is, the number of pictures used in calculating the trajectories.

FIG. 5B is a diagram which shows an example of a trajectory $x^i$ in one image subset. The trajectory $x^i$ is a vector that includes a set of pixel coordinates calculated from motion information 503 from a pixel i504 to a pixel corresponding to the pixel 1504 on other pictures, in the input image 501 from time t to time (t+(F-1)). Calculating trajectories for each of the image subsets as described above makes it possible to use a trajectory of a shorter time period, compared to the case where a trajectory is calculated without dividing T pictures into image subsets. Accordingly, there is an advantageous effect that a risk can be reduced of which a motion vector is not accurately calculated due to occlusion and thus a trajectory cannot be calculated. In addition, since it is less likely to be affected by occlusion, more trajectories can be calculated compared to the case where trajectories in a longer time period are calculated.

Next, in the subclass label assigning step S403, the subclass label assigning unit 203 classifies I trajectories represented in Expression 1 into S subclasses, for each of image subsets D.

A various methods are available because the classification into subclasses only requires classifying similar trajectories into the same subclass. For example, by setting the number of subclasses to S, with input of I trajectories as shown in Expression 1, and using the k-means method as shown in Non-Patent Literature 8, pp. 526-528, it is possible to classify I trajectories into S subclasses in such a manner that similar trajectories are classified into the same subclass.

Furthermore, with input of I trajectories, it is possible to use a clustering algorithm based on a dendrogram as shown in Non-Patent Literature 8, pp. 550-555. Here, processing of sequentially determining trajectory pairs having highest similarity (having a shortest distance) as the same subclass is repeatedly performed either predetermined times or until the number of subclasses becomes S. It is to be noted here that, to represent the similarity between trajectories, a Euclidian distance between trajectory vectors may be used, or a distance obtained by normalizing the Euclidian distance using the number of trajectories belonging to the same subclass may be used.

Figure 6:
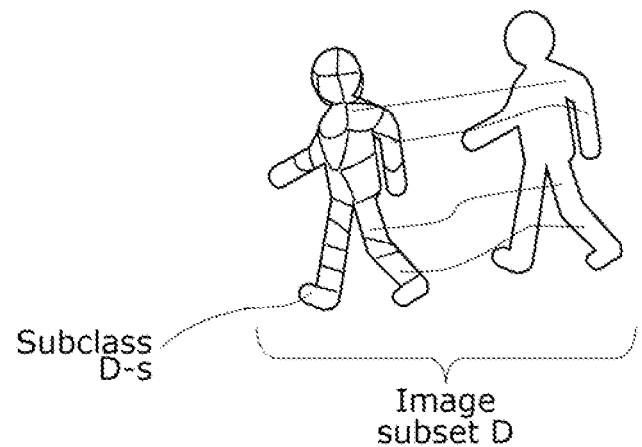
FIG. 6 is a diagram which illustrates an example of processing performed by a subclass label assigning unit according to Embodiment 1.

For example, when calculating the similarity (distance) between a pair of trajectories, as shown in FIG. 6, subclasses are likely to be generated uniformly when normalization is performed using the number of trajectories that belong to the same subclass. In other words, this reduces variation in the number of trajectories belonging to each subclass. It is to be noted that the distance or the similarity is not limited to the distance or similarity calculated by the distance calculation method described above, and may be any distance or similarity as long as it allows determination of similarity between trajectory vectors. In these cases, a smaller distance represents higher similarity. In other words, performed here is the processing for classifying, into the same subclass, pairs of trajectories either having highest similarity or having a smallest distance.

[Non Patent Literature 8] Richard O. Duda, Peter E. Hart and David G Stork, "Pattern Classification", John Wiley & Sons, Inc., 2001

By the processing using the clustering algorithm as described above, each of the trajectories x which belongs to a corresponding one of the image subsets D belongs to a corresponding one of subclasses D-s as shown in Expression 2. To be more specific, each of the trajectories is assigned with a label of the subclass D-s (hereinafter referred to as "subclass label D-s").

[Math. 2]

$$x^{i \in D\text{-}2} = (x_1^i, y_1^i, \ldots, x_f^i, y_f^i, \ldots, x_F^i, y_F^i) \quad \text{Expression 2}$$

It is to be noted that the classification into subclasses may be performed such that the size of each of the subclasses is equal to or smaller than the smallest size of a moving object that is to be detected. Alternatively, the number of subclasses may be set to a greater number than the number of moving objects which is previously assumed. Here, one moving object may be divided into plural portions as subclasses. Accordingly, since the number of subclasses S need not necessarily the same as the number of moving objects which exist in the image, and it is sufficient to set the number of subclasses S as a value larger than the number of moving objects, strict setting is not required even when a specific number of moving objects in a captured scene is unknown. Since each of the image subsets is independently processed at this time, it is not necessary that the number of subclasses S is the same between the image subsets, and the number of pictures F included in the image subset may be different for each of the image subsets.

Next, in the label propagation and update step S404, the label propagation unit 204A propagates, between the subclasses, label information of the subclass D-s obtained from each of the image subsets D, based on a trajectory share ratio between the subclasses. Then, the label propagation unit 204A determines whether or not to update the label of the subclass, by determining whether or not an arbitrary subclass pair, among the subclasses obtained from different image subsets, belongs to the same class, to assign a subclass label to each of the trajectories. The moving object detection unit 204B determines that the subclasses belong to the same class when the labels of the subclasses are updated to the same label. As a result, since one class corresponds to one moving object, classification of the trajectories into the respective classes leads to identifying a region of the moving object, and thus it is possible to detect the moving object. In addition, this allows label propagation using the trajectory share ratio, between subclasses that belong to temporally different image subsets, thereby enabling determining that subclasses with a high trajectory share ratio belong to the same class. Thus, there is an advantageous effect that occlusion has less effect compared to the case where a long-term trajectory is used, and that it is possible to perform segmentation having temporal coherence in the same manner as the case where a long-term trajectory is used.

The specific processing will be described below. As shown in Expression 2, FIG. 7A, and FIG. 7B, each trajectory is assigned with a subclass label D-s that is obtained from a corresponding one of the image subsets. The case where two image subsets are included is described here, however, since each of the image subsets can be independently processed, the number of image subsets is not limited to two, but more than two image subsets can be processed in the same manner. In addition, only part of trajectories are shown in FIG. 7A and FIG. 7B in consideration of viewability, however, the number of trajectories is not limited to the number described in this exemplary embodiment.

Figure 7A:
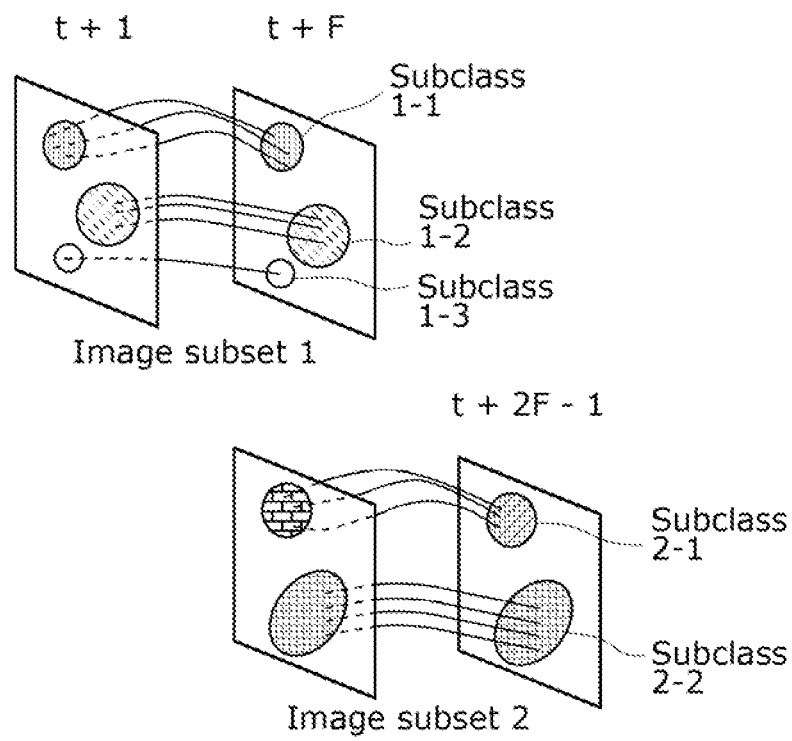
FIG. 7A is a diagram which illustrates a calculation example of a trajectory share ratio according to Embodiment 1.
Figure 7B:
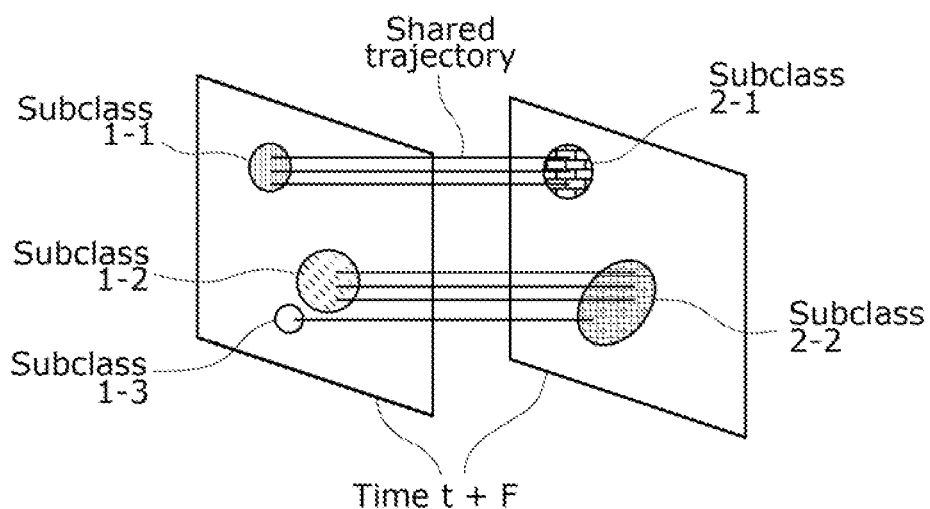
FIG. 7B is a diagram which illustrates a calculation example of the trajectory share ratio according to Embodiment 1.

FIG. 7A shows an image subset 1 including pictures from time (t+1) to time (t+F), and an image subset 2 including pictures from time (t+1) to time (t+2F−1). In addition, FIG. 7B shows trajectories shared between the picture of time (t+F) included in the image subset 1 in FIG. 7A and the picture of time (t+F) included in the image subset 2 in FIG. 7A.

As shown in FIG. 7A, it is assumed that the subclasses generated in the subclass label assigning step S403 are subclasses of which the number of subclasses S is three in the image subset 1 and subclasses of which the number of subclasses S is two in the image subset 2. As shown in FIG. 7B, in the case where the image of the same time (t+F) is used in the image subset 1 and the image subset 2, it is possible to calculate the number of trajectories shared between the subclasses calculated from the image subsets different from each other, on the image of time (t+F). Here, when the same trajectory exists between the subclasses; that is, when the trajectory which indicates motion of the same block exists between the subclasses, the trajectory is expressed as a trajectory of which the same trajectories (trajectories which indicate motion of the same block) are shared. To be more specific, as shown in FIG. 7B, a point of trajectory included in the subclass 1-1 and a point of trajectory included in the subclass 2-1 are positioned at the same pixel position in the image of time (t+F). Accordingly, the trajectories connected to the same pixel positions indicate the same trajectories. The corresponding points of the subclass 1-1 and the subclass 2-1 correspond to the same trajectory, and thus the subclass 1-1 and the subclass 2-1 share the trajectories. In the same manner as above, the subclass 2-2 shares trajectory with the subclass 1-2 or the subclass 1-3. Here, the number of trajectories shared between the subclasses Da and Db is denoted as share_DaDb. Here, the Da and Db correspond to the respective subclass labels. In addition, when the number of trajectories that belong to each of the subclasses is denoted as N_Da, the trajectory share ratio $W_{Da,Db}$ of the subclass Db that corresponds to the subclass Da can be expressed by Expression 3 below.

[Math. 3]
$$W_{Da,Db} = \frac{share\_DaDb}{N\_Da} \qquad \text{Expression 3}$$

Here, the label propagation unit 204A calculates the trajectory share ratio W for an arbitrary subclass pair. At this time, the subclass labels Da and Db are subclasses obtained from different image subsets. In addition, N_Da is the number of trajectories included in the subclass Da. It is to be noted that the processing of assigning a subclass label in the subclass label assigning step S403 is performed independently on each of the image subsets, and a similarity relation (the strength of temporal relation) between the subclasses is represented as the trajectory share ratio, sing the independently processed subclasses.

More specifically, in the example of FIG. 7A and FIG. 7B, the trajectory share ratio of the subclass 2-1 to the subclass 1-1 is represented as $w_{1-1, 2-1}=3/3$. In addition, the trajectory share ratio of the subclass 1-1 to the subclass 2-1 is represented as $w_{2-1, 1-1}=3/3$. Meanwhile, the trajectory share ratio of the subclass 1-2 to the subclass 2-2 is represented as $w_{2-2, 1-2}=3/4$. In addition, the trajectory share ratio of the subclass 2-2 to the subclass 1-2 is represented as $w_{1-2, 2-2}=3/3$. Furthermore, the trajectory share ratio of the subclass 1-3 to the subclass 2-2 is represented as $w_{2-2, 1-3}=4$. In addition, the trajectory share ratio of the subclass 2-2 to the subclass 1-3 is represented as $w_{1-3, 2-2}=1/1$. Here, the trajectory share ratio of a subclass pair between which a trajectory is not shared is assumed to be W=0. $W_{1-1, 1-2}=0$, for example. In addition, the trajectory share ratio of a subclass pair in the same image subset is assumed to be W=0. $W_{1-2, 1-2}=0$, for example. Furthermore, the trajectory share ratio of a subclass pair between image subsets which are not temporally adjacent may be W=0. In addition, a diagonal component represent the subclass itself, and thus the share ratio is W=1, for example.

In addition, the trajectory share ratio W can be expressed as an asymmetric matrix as shown in Expression 4. However, the trajectory share ratio W may be expressed as a symmetric matrix. More specifically, an average value of the trajectory share ratio $W_{Da,Db}$ of the subclass Db to the subclass Da and the trajectory share ratio $W_{Db,Da}$ of the subclass Da to the subclass Db may be reset as each of the trajectory share ratios $W_{Da,Db}$ and $W_{Db,Da}$. Alternatively, a value larger between the trajectory share ratios $W_{Da,Db}$ and $W_{Db,Da}$ may be reset as each of the trajectory share ratios $W_{Da,Db}$ and $W_{Db,Da}$. Such resetting allows the trajectory share ratio W to be expressed as a symmetric matrix.

[Math. 4]

$$W = \begin{array}{c} 1-1 \\ \vdots \\ Da \\ Db \\ \vdots \end{array} \begin{pmatrix} 1-1 & \cdots & Da & Db & \cdots \\ 1 & \cdots & \cdots & \cdots & \cdots \\ \cdots & 1 & \cdots & \cdots & \cdots \\ \cdots & \cdots & 1 & W_{Da,Db} & \cdots \\ \cdots & \cdots & W_{Db,Da} & 1 & \cdots \\ \cdots & \cdots & \cdots & \cdots & 1 \end{pmatrix}$$ Expression 4

Next, the label propagation unit 204A propagates label information as below, using the trajectory share ratio W calculated by Expression 3. Non Patent Literature 9 discloses a method of label propagation; however, there is no description as to the method of calculating similarity between subclasses from independently calculated subclasses, nor an example representing the similarity by the trajectory share ratio.

In this exemplary embodiment, the similarity between the subclasses calculated independently is represented by the trajectory share ratio, thereby performing the label propagation as below. To be more specific, the label propagation is performed by repeatedly calculating the similarity between subclasses, according to this exemplary embodiment. Here, the similarity between subclasses is indicated as an element of a subclass matrix Z described below.

[Math. 5]

$$Z^{l+1} = \alpha W Z^l + (1-\alpha) Y$$ Expression 5

Here, the first term in the right-hand side represents label propagation using the similarity between subclasses, The repeated calculation of the first term in Expression 5 using a trajectory share ratio corresponds here to the label propagation using the trajectory share ratio as weight. In addition, the second term represents subclass reliability described below. The subclass matrix is $Z=[z_1^T, z_2^T, \ldots, z_p^T, \ldots z_\Gamma^T]$, and $z_p^T$ is a subclass label vector of the subclass p. $z_p^T$ is a vector which has the number of elements of the number of subclass labels and of which only an element corresponding to each of the subclasses is denoted as 1 and other elements are denoted as 0 in an initial state (I=1). For example, $z_1^T=[1, 0, 0, \ldots, 0]$ and $z_2^T=[0, 1, 0, 0]$. More specifically, the subclass matrix Z is, in the initial state, a unit matrix exemplified in Expression 6.

[Math. 6]

$$Z = \begin{pmatrix} 1 & 0 & \cdots & 0 \\ 0 & 1 & \cdots & 0 \\ \vdots & \vdots & \ddots & \vdots \\ 0 & 0 & \cdots & 1 \end{pmatrix}$$ Expression 6

The symbol I represents the number of repetition. It is to be noted that $\alpha \le 1$, and $\alpha=1$ may be specified when the subclass reliability is assumed to be equal between all of the subclasses, or $\alpha=0.99$ and the like may be specified when the subclass reliability is taken into consideration.

The subclass reliability matrix is $Y=[y_1^T, y_2^T, \ldots, y_p^T, \ldots, y_\Gamma^T]$, and Y is a diagonal matrix. $y_p^T$ is a reliability vector of the subclass p, which has the number of elements of the number of subclass labels as with the subclass label vector $z_p^T$, and of which only an element corresponding to each of the subclass labels has a value greater than 0 and other elements are represented as 0. For example, $y_1^T=[2, 0, 0, \ldots, 0]$ and $y_2^T=[0, 3, 0, \ldots, 0]$. The numeral "2" in $y_1^T$ represents the reliability for the subclass 1, and the numeral "3" in $y_2^T$ represents the reliability for the subclass 2. To be more specific, the subclass reliability matrix Y is a diagonal matrix exemplified in Expression 7.

[Math. 7]

$$Y = \begin{pmatrix} 2 & 0 & \cdots & 0 \\ 0 & 3 & \cdots & 0 \\ \vdots & \vdots & \ddots & \vdots \\ 0 & 0 & \cdots & 1 \end{pmatrix}$$ Expression 7

The reliability may be set as below. For example, the reliability may be set such that the subclass reliability increases as the number of trajectories that belong to each of the subclasses are larger, or such that the subclass reliability increases as an average temporal length of trajectories that belong to each of the subclasses are greater. Alternatively, the reliability may be set such that the subclass reliability increases as a spatial size of a region including trajectories that belong to each of the subclasses are greater.

The label propagation unit 204A performs the process of repeating the calculation of Expression 5 for the predetermined number of times. It is to be noted that such a process of performing repeated operation is referred to as a label propagation process in Non Patent Literature 9, Then, whether or not to update the subclass label is determined by Expression 8 below.

[Math. 8]

$$z_p^{Final} = \mathrm{argmax}_q Z_{pq}$$ Expression 8

Here, Expression 8 indicates the row number having the largest value for each column of the subclass matrix Z having p columns and q rows. For example, it is assumed that the subclass matrix Z is represented as Expression 9. In this case, in the first column, the value in the third row is 1.5 which is the largest in the first column, Accordingly, 3 is obtained from Expression 8 as the row number having the largest value in the first column. This means that 3 is reassigned as a subclass label to the subclass having the subclass label 1 in the initial state.

[Math. 9]

$$W = \begin{array}{c} 1 \\ 2 \\ 3 \\ \vdots \\ \Gamma \end{array} \begin{pmatrix} 1 & \cdots & \cdots & \cdots & \Gamma \\ 0.8 & \cdots & \cdots & \cdots & 0.2 \\ 0.7 & \cdots & \cdots & \cdots & 0.3 \\ 1.5 & \cdots & \cdots & \cdots & 0.9 \\ \cdots & \cdots & \cdots & \cdots & \cdots \\ 0.8 & \cdots & \cdots & \cdots & 0.8 \end{pmatrix}$$ Expression 9

More specifically, the column number of the subclass label vector z calculated by Expression 5 indicates the subclass label in the initial state, and the label propagation unit 204A updates, as a new subclass label, the row number having the largest value in each of the columns. With this process, the plural subclasses belong to the same class, and thus it is possible to determine, as the same class, different subclasses including subclasses calculated from independent image subsets. In addition, with the processes of Expression 5 and Expression 8, the relationship between the subclasses obtained from the same image subset is automatically taken into consideration. Accordingly, in such a case as indicated in FIG. 1A and FIG. 1B, the subclasses a-1 and a-2 are in the same class and the subclasses b-1 and b-2 are in the same class, producing an advantageous effect that erroneous detection can be reduced. To be more specific, it is possible to determine whether or not subclasses are belong to the same class, even for the subclasses calculated from temporally different image calculates. It is therefore possible to detect a moving object while temporally maintaining coherence and reducing the risk that trajectories cannot be calculated due to occlusion.

Figure 8A:
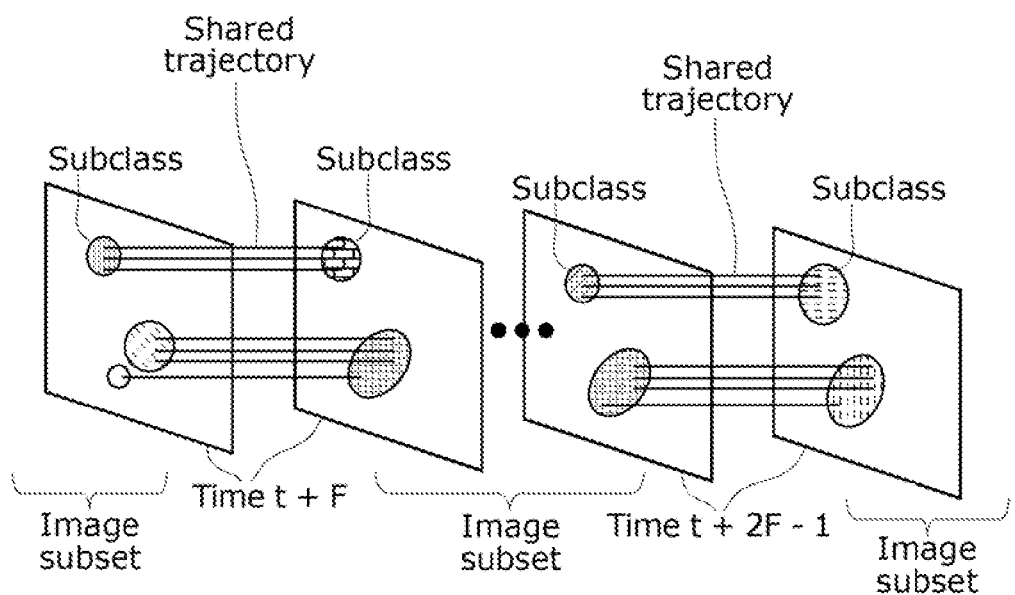
FIG. 8A is a diagram which illustrates an example of processing performed by a label propagation unit and a moving object detection unit according to Embodiment 1.
Figure 8B:
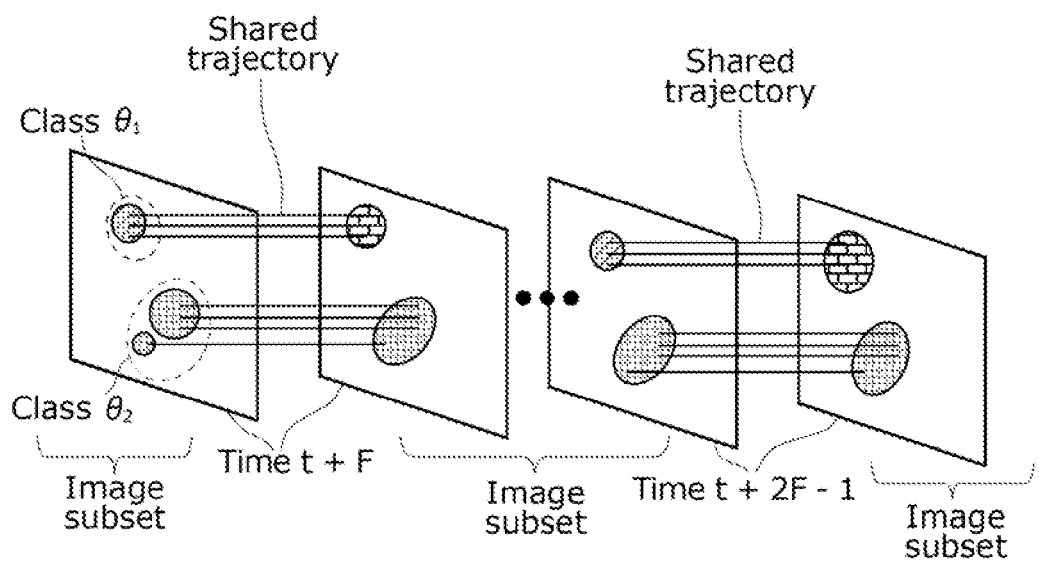
FIG. 8B is a diagram which illustrates an example of processing performed by the label propagation unit and the moving object detection unit according to Embodiment 1.
Figure 8C:
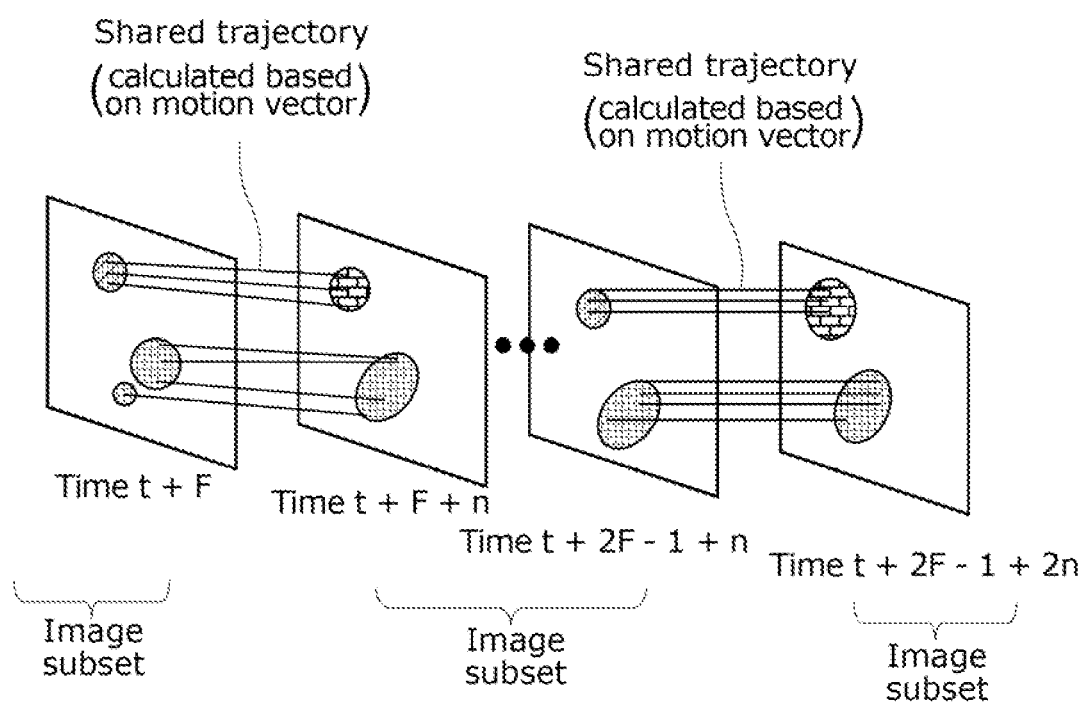
FIG. 8C is a diagram which illustrates an example of processing performed by the label propagation unit and the moving object detection unit according to Embodiment 1.

The following describes a specific advantageous effect, with reference to FIG. 8A and FIG. 8C, FIG. 5A represents subclasses each of which is calculated from a corresponding one of three image subsets. In FIG. 8A to FIG. 8C, the difference in texture of the subclasses indicates that the subclasses are different subclasses. More specifically, the subclasses to which the same subclass label is assigned have the same texture. Next, the label propagation process and the label update process indicated by Expression 5 and Expression 8 are performed, thereby making it possible to integrate subclasses calculated from temporally different image subsets into one class ($\theta_1$ and $\theta_2$ in the example of FIG. 8B) each of which maintains temporal coherence, as shown in FIG. 8B. Furthermore, as a similar example to the example in which one moving object is divided into plural subclasses as shown in FIG. 1A and FIG. 1B, it is possible to integrate the two left subclasses in FIG. 5A into one class (class $\theta_2$), by performing the label propagation process. As described above, even when one moving object is divided into plural subclasses, it is possible, through the label propagation and update step S404, to integrate, into one class, the plural subclasses that belong to one moving object which is one of the causes of erroneous detection. In addition, as shown in FIG. 8B, the subclasses generated from the image subset positioned left in the diagram and the subclasses generated from the image subset positioned right in the diagram which are not temporally adjacent, can be processed with the repeat operation of Expression 5 and the process of Expression 8. More specifically, it is possible to determine whether or not the image subsets which are not temporally adjacent belong to the same class, using only the information of trajectory share ratio between subclasses generated from adjacent image subsets. This means that image subsets are not limited to temporally adjacent two image subsets. Even when the image subsets are three or more, it is possible to determine whether or not a pair of subclasses of non-adjacent image subsets belong to the same class. As a result, it is possible to properly detect and extract a moving object even under the circumstance in which occlusion is likely to occur, while solving occlusion occurring due to an imaging position of a camera and erroneous detection of which one moving object is separated into plural portions. In addition, even under the circumstance in which occlusion is likely to frequently occur as in FIG. 1B, there is an advantageous effect that it is possible to extract a moving object with higher density, by generating subclasses using plural image subsets configured of images in a short time period and performing the label propagation process. More specifically, the effect of occlusion can be reduced by using image subsets configured of images in a short time period, and thus it is possible to generate subclasses with higher density. In addition, the subclasses have coherence therebetween by performing the label propagation process. On the other hand, when trajectories in a long time period are used, only the head region is tracked as in the white moving object (the detection result b-1) in FIG. 1B, and other trajectories such as a body and the leg region are lost to be tracked on the way. Therefore, it is difficult to extract the moving object with high density.

[Non Patent Literature 9] F. Wang and C. Zhang, "Label propagation through linear neighborhoods", In Proc of International Conference on Machine Learning, 2006

It is to be noted that calculation of the trajectory share ratio between subclasses generated from different image subsets need not necessarily be performed on the image of the same time, but can also be calculated from the number of trajectories shared on two images of time (t+F) and time (t+F+n) as shown in FIG. 5C. More specifically, a corresponding point between the images of time (t+F) and time (t+F+n) is calculated by the trajectory calculating unit 202. Accordingly, the label propagation unit 204A uses the information of the corresponding point to calculate a corresponding point, at time (t+F+n), of a trajectory that belongs to the subclass D-s at time (t+F). Here, n is greater than or equal to 1. Then, it is possible to calculate the share ratio in the same manner as the method described above, from the number of trajectories that belong to the subclass D-s at time (t+F+n) and the number of the above-described corresponding points that belong to the subclass D-s at time (t+F+n). Then, the corresponding points at time (t+F) is obtained using motion information calculated in the trajectory calculating step S402, from the trajectories that belong to the subclass D-s at time (t+F+n). Then, it is possible to calculate the share ratio from the number of trajectories that belong to the subclass D-s at time (t+F) and the number of the above-described corresponding points that belong to the subclass D-s at time (t+F+n). This also applies to the case of time (t+2F−1+n) and (t+2F−1+2n). As described above, images of the same time need not necessarily be shared between the image subsets.

Next, in the image output step S405, the output unit 205 outputs the result of detecting the moving object in the video, which is performed in the label propagation and update step S404. More specifically, image processing is performed on the video received in the image inputting step S401 so as to be displayed, for example, in a different mode per moving object region $\theta$ detected in the label propagation and update step S404, and the image on which the image processing is performed is output to a display apparatus or the like. Through the processes described above, it is possible to perform display while temporally maintaining coherence and distinguishing the respective moving objects.

Figure 9:
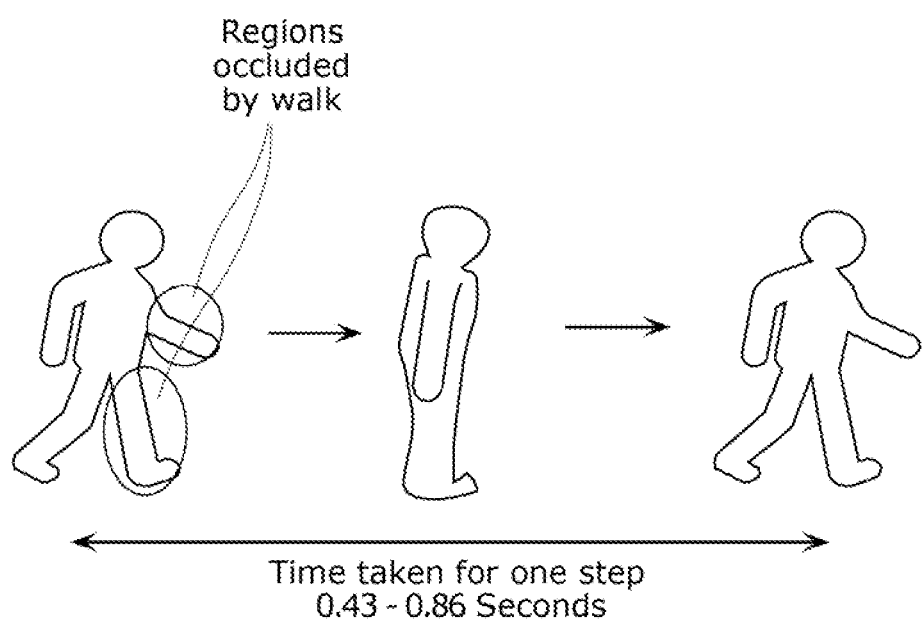
FIG. 9 is a diagram which explains a walking pace of a person.

The following describes the method of determining the number of images F of image subsets in the case where the moving object is a walking person. A walking pace which indicates how many steps can be proceeded for in a minute is approximately 110 to 120 for general adult human, approximately 70 to 80 in the case of slow walk, and approximately 140 in the case of walk in a quick pace. Accordingly, time required for one step can be assumed as 0.43 to 0.86 seconds. Meanwhile, when an image of a walking person is captured from a lateral direction as shown in FIG. 9, one of the legs is completely occluded by the other with proceeding of one step. As to such a problem unique to an articulated object, it is possible to reduce the effect of occlusion by determining the number of images F that corresponds to a shorter time period than a time period required for half a step. For example, in the case of walking in a quick pace, F is set to the number of images that corresponds to a shorter time period than 0.22 seconds. When captured in 30 fps (frame/second), for example, F is set to fewer than or equal to 6. In addition, in the case of slow walk, when captured in 30 fps, for example, F is set to fewer than or equal to 12. It is to be noted that the number of image subsets is sufficient to be set to more than or equal to two, as described above.

As described above, it is possible to properly detect and extract a moving object even under the circumstance in which occlusion is likely to occur, while solving occlusion that occurs due to an imaging position of a camera and erroneous detection of which one moving object is separated into plural portions.

Thus, today, with video capturing apparatuses such as a digital video camera becoming widely used, the present disclosure provides an extremely high practical value as technology applied to: focus control and image quality improvement processing in digital cameras; a driving safety support system for vehicles; or collision avoidance control to avoid collision against a person and alarming using a robot.

Embodiment 2

Next, a moving object detection apparatus according to Embodiment 2 of the present disclosure will be described.

Figure 10:
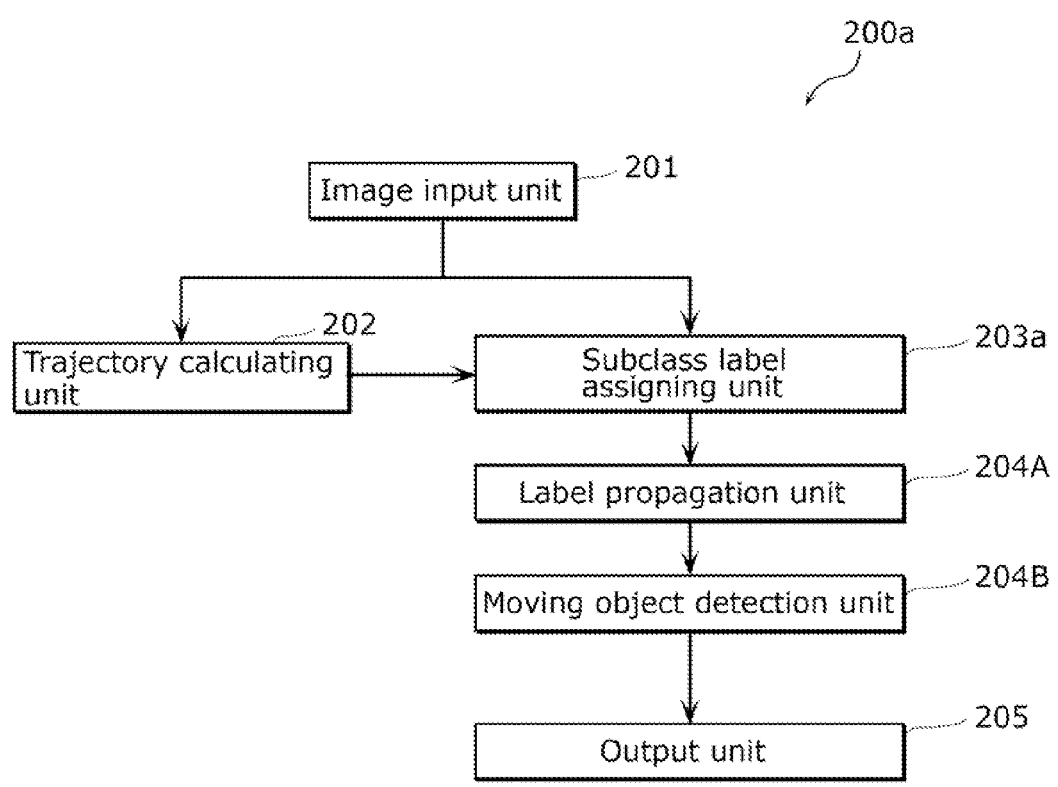
FIG. 10 is a diagram which illustrates a basic configuration of a moving object detection apparatus according to Embodiment 2.

Here, an example is described in which the subclass label assigning process is performed by the subclass label assigning unit 203 in a different manner from the method described in Embodiment 1. FIG. 10 is a diagram which illustrates a configuration of a moving object detection apparatus 200a according to Embodiment 2. The moving object detection apparatus 200a according to Embodiment 2 includes: an image input unit 201; a trajectory calculating unit 202; a subclass label assigning unit 203a; a label propagation unit 204A; a moving object detection unit 204B; and an output unit 205.

Such a moving object detection apparatus 200a according to Embodiment 2 has the same configuration as the moving object detection apparatus 200 according Embodiment 1, except for the configuration of the subclass label assigning unit 203a, and therefore the description of the same constituent elements will be omitted.

It is to be noted that, although the subclass label assigning unit 203a is included in the subclass classification unit 213 illustrated in FIG. 2, illustration of the subclass classification unit 213 is omitted in this diagram. In addition, although the label propagation unit 204A is included in the inter-subclass similarity calculating unit 214A illustrated in FIG. 2, illustration of the inter-subclass similarity calculating unit 214A is omitted in this diagram.

The subclass label assigning unit 203a, for each of the image subsets, uses at least one of edge, color and brightness of at least one of the images included in the image subset, to divide the image into plural regions, generates subclasses, and assigns a subclass label to each of the trajectories that pass through the regions resulting from the division.

More specifically, the subclass label assigning unit 203a, for each of the image subsets, performs a process for classifying similar image regions into the same subclass, from at least one of the images received by the image input unit 201, using the brightness, the edge information, the color, and so on. Next, the subclass label assigning unit 203a assigns, to the trajectory calculated by the trajectory calculating unit 202, a subclass label of the image region through which the trajectory passes. More specifically, the subclass label assigning unit 203a classifies trajectories passing through the image regions classified into the same subclass, by assigning the same subclass label to the trajectories. The difference from Embodiment 1 is in performing the classification into subclasses not based on trajectories but based on information of the image, and assigning subclass labels to the trajectories based on the information. It is to be noted that the subclass classification process performed on the image region by the subclass label assigning unit 203a can be performed without using the information on the trajectories. Thus, the subclass classification process need not necessarily be performed after the process performed by the trajectory calculating unit 202, and both processes may be performed in parallel, or the subclass classification process on the image region may be performed before the process performed by the trajectory calculating unit 202.

Figure 11:
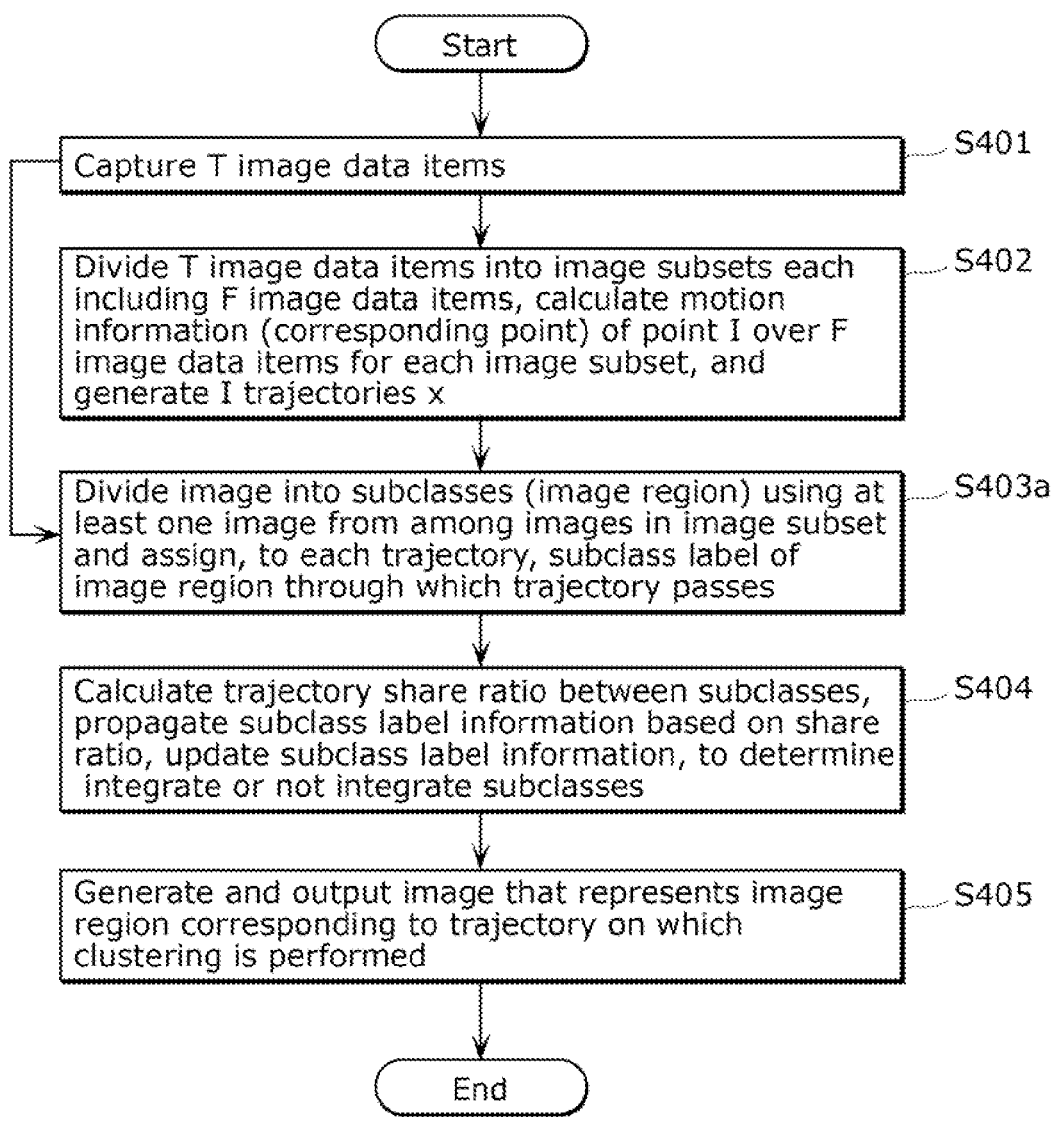
FIG. 11 is a flowchart which illustrates a basic operation performed by the moving object detection apparatus according to Embodiment 2.

The following describes an operation of the moving object detection apparatus 200a according Embodiment 2, with reference to FIG. 11.

Since steps S401 and S402 are the same as those in Embodiment 1, the description thereof will be omitted.

Next, in a subclass label assigning step S403a, the subclass label assigning unit 203a performs image segmentation using at least one of the images received in the image input step S401. Here, any method may be used as long as segmentation is performed, in the method, using input such as a pixel (brightness) value, color information, edge information or the like and position information thereof, and for example, the method disclosed in Non Patent Literature 10 can be used.

[Non Patent Literature 10] X. Ren and J. Malik, "Leaning a Classification Model for Segmentation, International Conference on Computer Vision", Vol. 1, p. 10-17, 2003

Figure 12:
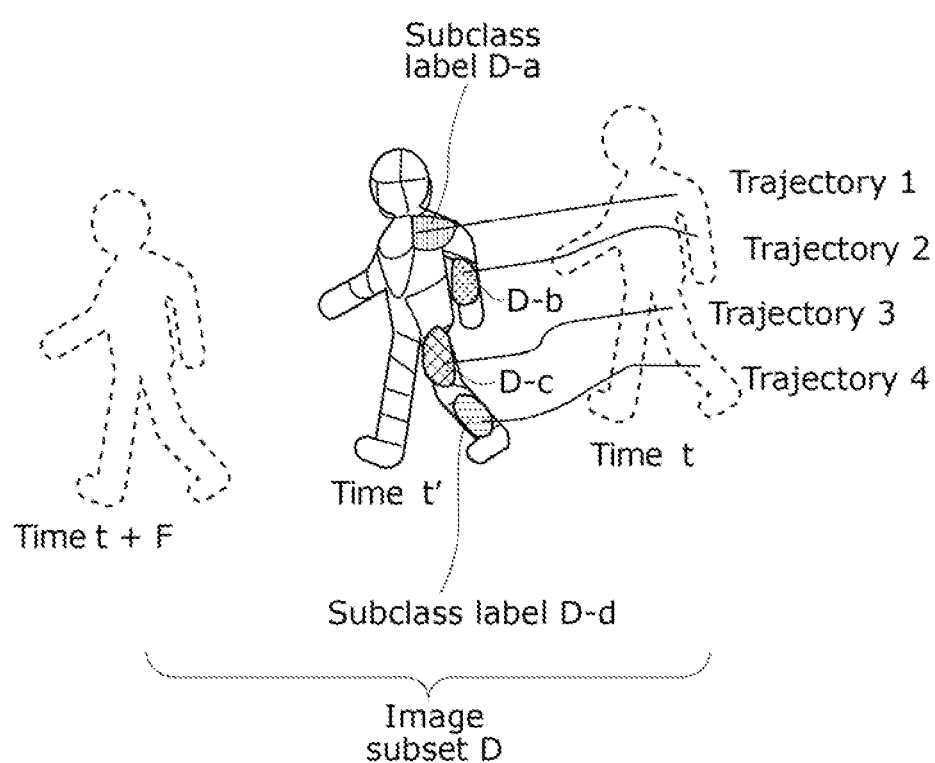
FIG. 12 is a diagram which illustrates an example of processing performed by a subclass label assigning unit according to Embodiment 2.

According to the method disclosed in Non Patent Literature 10, an image region is segmented into a plurality of small regions using edge information or smoothness of a pixel value near the space. For example, when the target is a person, as shown in FIG. 12, the result shows a human figure finely segmented into portions. Here, when images of F frames are input to each of the image subsets, for example, one of the images may be selected to perform segmentation. Here, segmentation may be carried out using a temporally intermediate image from among the plural images, or segmentation may be performed using temporally the first or the last image in the image subset, and there is no restriction in selection of an image.

Alternatively, for example, the pixel values and pixel positions may be arranged into a three-dimensional vector, and with an input of the three-dimensional vector, the image region may be segmented using a clustering algorithm such as the k-means method, or of course, color information such as RGB and pixel position information may be arranged into a five-dimensional vector to be used instead of the above-described three-dimensional vector. Thus, any method may be used as long as the method allows spatially segmenting the image.

Then, for each of the image subsets, a subclass label is assigned to each trajectory based on a relationship between the time of the image selected for the segmentation and the trajectory calculated in the trajectory calculating step S402, with the regions resulting from the segmentation being as subclasses.

More specifically, as shown in FIG. 12, the subclass label assigning unit 203a, assuming that each region resulting from the special segmentation is a subclass, assigns a subclass label according to which subclass each trajectory passes through on the image at time t' selected for the segmentation. For example, the trajectories from 1 to 4 pass through the respective subclasses D-a to D-d at time t'. Thus, the subclass label assigning unit 203a assigns each of the subclass labels D-a to D-d to a corresponding one of the trajectories 1 to 4. By performing such a process on the corresponding trajectory, each trajectory x belongs to any one of the subclasses D-s as shown in Expression 2. In other words, each trajectory is assigned with a label of the subclass D-s as with the process in the subclass label assigning step S403 according to Embodiment 1. This process is carried out for each of the image subsets.

Since the processes in and subsequent to the label propagation and update step S404 are the same as those in Embodiment 1, the description thereof will be omitted.

As described above, it is possible to detect a moving object in an image based on the trajectories even under the crowded circumstance in which occlusion is likely to occur, according to Embodiment 2. Furthermore, compared to Embodiment 1, since it is possible to explicitly use information such as color and brightness, for example, it is possible to perform moving object detection with higher accuracy when detecting an moving object dressed in a single color or the like.

As described above, it is possible to properly detect and extract a moving object even under the circumstance in which occlusion is likely to occur, while solving occlusion occurring due to an imaging position of a camera and erroneous detection of which one moving object is separated into plural portions.

Thus, today, with video capturing apparatuses such as a digital video camera becoming widely used, the present disclosure provides an extremely high practical value as technology applied to: focus control and image quality improvement processing in digital cameras; a driving safety support system for vehicles; or collision avoidance control to avoid collision against a person and alarming using a robot.

Embodiment 3

Figure 13:
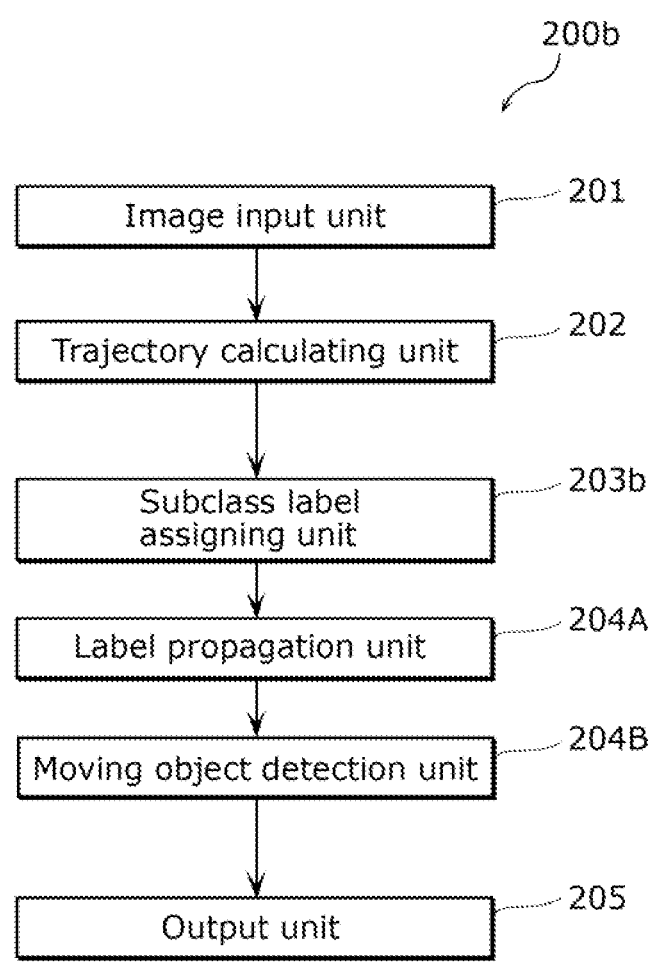
FIG. 13 is a diagram which illustrates a configuration of a moving object detection apparatus according to Embodiment 3.

Next, a moving object detection apparatus according to Embodiment 3 of the present disclosure will be described. Here, an example is described in which the subclass label assigning process is performed by the subclass label assigning unit 203 in a different manner from the methods described in Embodiment 1 and Embodiment 2. FIG. 13 is a diagram which illustrates a configuration of a moving object detection apparatus 200b according to Embodiment 3. The moving object detection apparatus 200b according to Embodiment 3 includes: an image input unit 201; a trajectory calculating unit 202; a subclass label assigning unit 203a; a label propagation unit 204A; a moving object detection unit 204B; and an output unit 205. Such a moving object detection apparatus 200b according to Embodiment 3 has the same configuration as the moving object detection apparatus 200 according to Embodiment 1, except for the configuration of the subclass label assigning unit 203b, and therefore the description of the same constituent elements will be omitted.

It is to be noted that, although the subclass label assigning unit 203b is included in the subclass classification unit 213 illustrated in FIG. 2, illustration of the subclass classification unit 213 is omitted in this diagram. In addition, although the label propagation unit 204A is included in the inter-subclass similarity calculating unit 214A illustrated in FIG. 2, illustration of the inter-subclass similarity calculating unit 214A is omitted in this diagram, The subclass label assigning unit 203b (a) calculates, for the trajectories calculated by the trajectory calculating unit 202, a distance that indicates the similarity between the trajectories, (b) combines, from among the calculated distances, distances each of which is smaller than a predetermined threshold, to transform the calculated distances into geodetic distances, (c) calculates, for each of the image subsets, a geodetic distance of two arbitrary trajectories from among the trajectories which are included in the image subset and calculated by the trajectory calculating unit 202, the geodetic distance being a distance of a path that passes through, as a relay point, a trajectory other than the two trajectories, from one of the two trajectories to the other, detects a discontinuity point in a distribution of the obtained geodetic distances, sorts out, as one cluster, trajectories which are spaced apart from each other by the geodetic distance shorter than the detected discontinuity point, to classify the trajectories into subclasses, and assigns, for each of the trajectories, a subclass label that is an identifier of the subclass into which the trajectory is classified.

This means that the subclass label assigning unit 203b, in the same manner as in Embodiment 1, classifies the trajectories of each of the image subsets which are calculated by the trajectory calculating unit 202 into subclasses such that similar trajectories belong to the same class, and assigns a label to the subclass that is a result of classifying each of the trajectories. The difference from Embodiment 1 is in that a geodetic distance is used as the similarity between the trajectories when performing the classification into subclasses.

Figure 14:
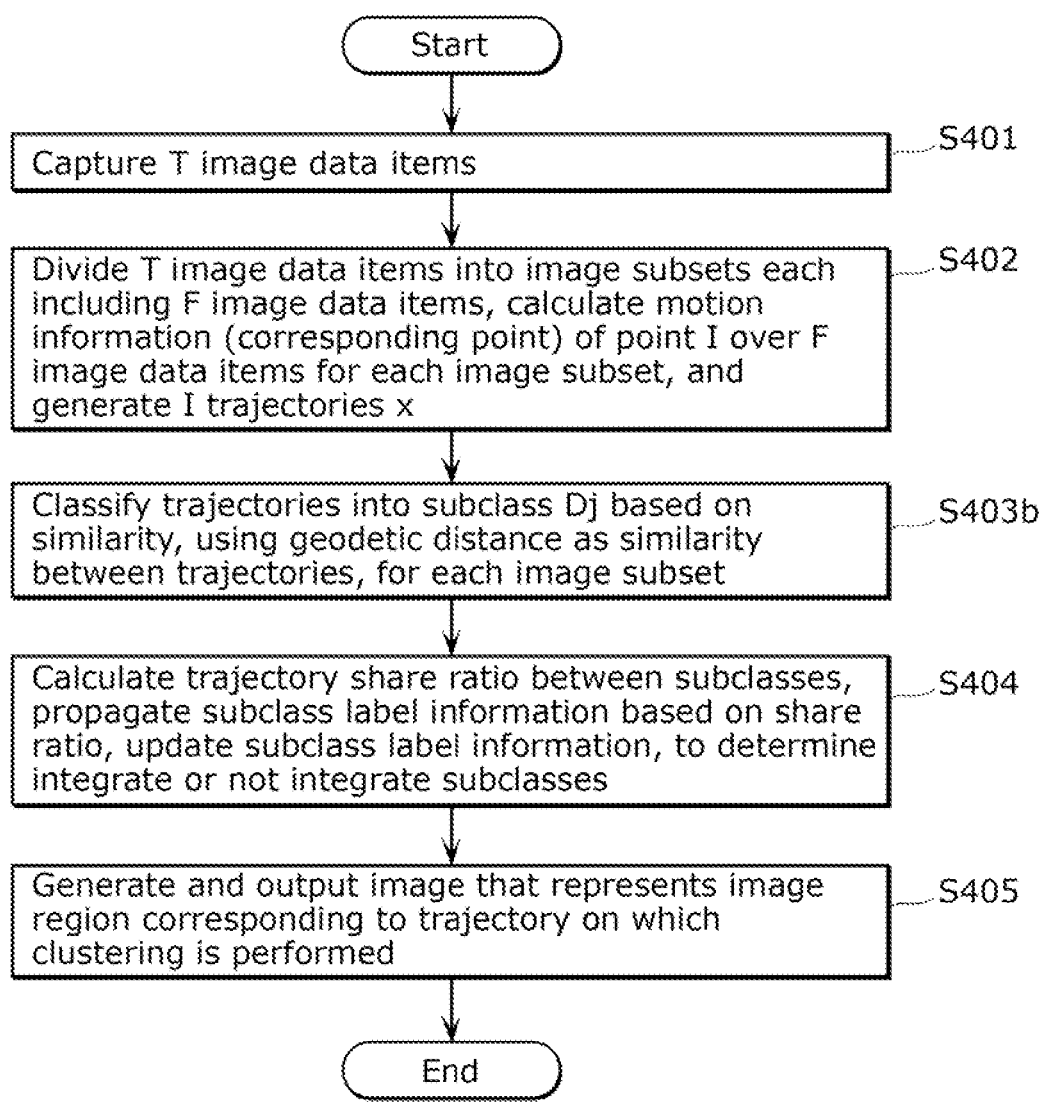
FIG. 14 is a flowchart which illustrates a basic operation performed by the moving object detection apparatus according to Embodiment 3.

The following describes an operation of the moving object detection apparatus 200b according to Embodiment 3, with reference to FIG. 14, Since steps S401 and S402 are the same as those in Embodiment 1, the description thereof will be omitted.

Next, in the subclass label assigning step S403b, the subclass label assigning unit 203b calculates, for each of the mage subsets, a distance matrix including a similarity in motion of a pixel using the trajectory i calculated by Expression 2. A linear distance f j) between the trajectory i and the trajectory j can be calculated as below.

[Math. 10]

$$f(i,j) = ptn_{ij} + w \cdot mtn_{ij} \qquad \text{Expression 10}$$

Here, w is a weighting factor and a parameter to be set by a designer.

In addition, $ptn_{ij}$ and $mtn_{ij}$ will be described below.

[Math. 11]

$$ptn_{ij} = \frac{1}{T}\sum_{i=1}^{T} d_{ij}^{t} \qquad \text{Expression 11}$$

[Math. 12]

$$mtn_{ij} = \sqrt{\frac{1}{T}\sum_{i=1}^{T}(d_{ij}^{t} - ptn_{ij})^2} \qquad \text{Expression 12}$$

[Math. 13]

$$d_{ij}^{t} = \sqrt{(x_t^i - x_t^j)^2 + (y_t^i - y_t^j)^2} \qquad \text{Expression 13}$$

As shown in Expression 10, in addition to a temporal average value of the distance between trajectories that is expressed by Expression 11, temporal variation between trajectories that is expressed by Expression 12 is an element of the linear distance f(i, j). The temporal variation between trajectories expressed by Expression 12 shows, in particular, similarity in pixel motion, and thus allows capturing of not only a rigid body of which the distance relationship between pixels does not temporally change but also shape change of an articulated object or the like. It is to be noted here that the above-described distance calculation need not necessarily be performed, but any distance may be used as long as it is the distance measurement that indicates the similarity between the trajectories.

Next, a threshold R is applied to the linear distance f(i, j) calculated by Expression 10, and the process of nonlinearization is performed on the threshold as below to calculate f'(i, j).

[Math. 14]

$$f'(i,j) = \begin{cases} f(i,j) & \text{if } i \text{ is } R\text{-}NearestNeighbor \\ \infty & \text{otherwise} \end{cases} \quad \text{Expression 14}$$

When the focus is on the trajectories i, R trajectories j are selected in ascending order of the linear distance from the trajectory i, and changes the distances from unselected trajectories j into an infinite value without changing the distances from the selected trajectories. It is to be noted that, although the trajectories j are selected in ascending order of the linear distance f(i, j), the process of nonlinearization may be performed by setting the threshold R as the expression below

[Math. 15]

$$f'(i,j) = \begin{cases} f(i,j) & \text{if } f(i,j) < R \\ \infty & \text{otherwise} \end{cases} \quad \text{Expression 15}$$

More specifically, the subclass label assigning unit 203b may select, for each of the image subsets calculated by the trajectory calculating unit 202, a predetermined number of trajectories in ascending order of distance for each of the trajectories, and after distances from the unselected trajectories are nonlinearized into the infinite value, each of the distances may be converted into a geodetic distance. Alternatively, as shown in Expression 15, the subclass label assigning unit 203b may select, when the focus is on the trajectories i, trajectories j each having a distance smaller than or equal to the predetermined threshold R for each of the trajectories j calculated by the trajectory calculating unit 202, perform the process of non-linearization for changing the distances from unselected trajectories into the infinite value, and then convert each of the distances into the geodetic distances.

It is to be noted that the technique of nonlinearizing distances is not limited to that using functions described above, but may be anything that performs nonlinearization on the distance related to the trajectories i and j.

Next, the subclass label assigning unit 203b calculates the geodetic distance as in the following expression, using the nonlinearized distance f'(i, j).

[Math. 16]

$$g(i,j) = \min(f'(i,j), f'(i,s) + f'(s,j)) \quad \text{Expression 16}$$

It is to be noted that min(x, y) is a function which returns a smaller one of the value x and the value y. In addition, the trajectory s is a relay point between the trajectory i and trajectory j. Here, the relay point s in f'(i, s)+f'(s, j) is not limited to a single point. This method is a shortest path search method known as Dijkstra method and is described in the following Non Patent Literature 11.

[Non Patent Literature 11] E. W. Dijkstra, "A note on two problems in connexion with graphs", Numerische Mathematik, pp. 269-271, 1959

Figure 15:
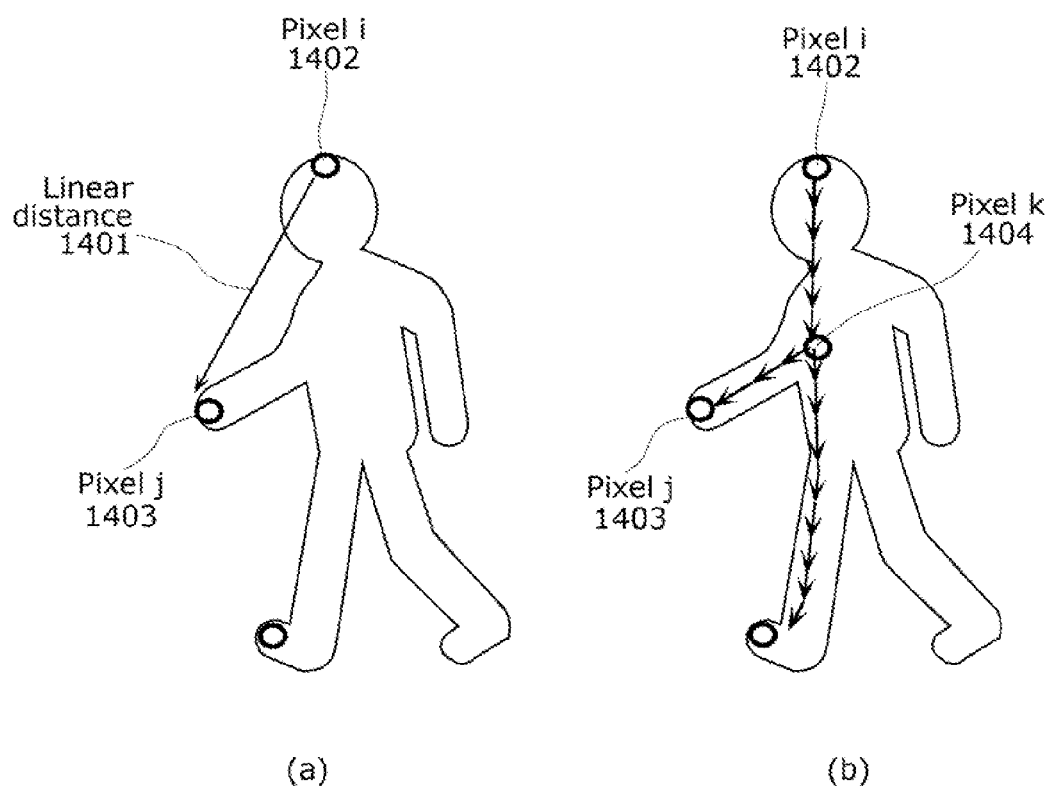
FIG. 15 is a diagram which illustrates an example of an advantageous effect of a geodetic distance according to Embodiment 3.

Here, the advantageous effect of the nonlinearization expressed in Expressions 14 to 16 is described with reference to FIG. 15 (a) and (b). Here, in order to clearly describe the difference between the linear distance f(i, j) and the geodetic distance g(i, j), the distance between trajectories at time t, as shown in Expression 11, is given as an example. In practice, it is possible to capture not only the shape but also the shape variation of an articulated object or the like by using a fluctuation component of the distance between the trajectories in addition to the distance between trajectories as a similarity in pixel motion, as expressed in Expression 12. FIG. 15(a) is an example of the case where the processes in Expressions 14 to 16 above are not performed. For example, a distance between a head-region pixel i1402 and a finger-region pixel j1403 is a distance indicated by a linear distance 1401. On the other hand, when the threshold R is properly set by performing the nonlinearization as expressed in Expressions 14 to 16 above, the distance between the head-region pixel j1402 and the finger-region pixel j1403 is a distance as a linear sum as indicated by arrows passing though a pixel k1404 to the pixel j, as shown in FIG. 15(b). Thus, whereas the linear distance 1401 cannot continuously express, as the data, the shape of an object articulated with joints such as a person, the geodetic distance can express the continuity of such a shape articulated with joints. It is to be noted that the method of calculating the geodetic distance is not limited to Expression 16.

Figure 16:
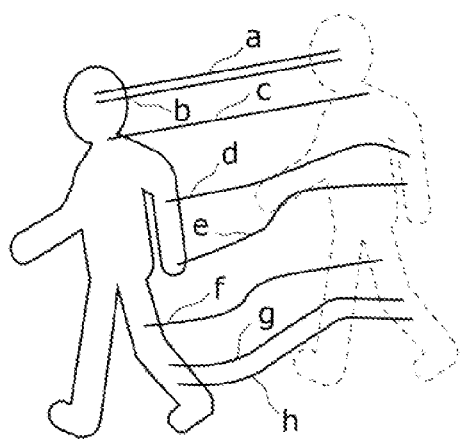
FIG. 16 is a diagram which illustrates an example of processing performed by a subclass label assigning unit according to Embodiment 3.
Figure 16:
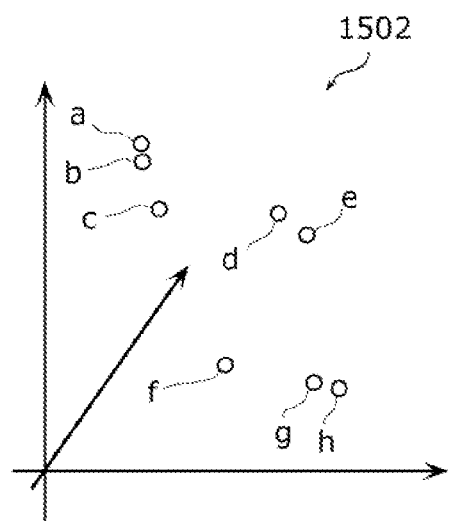
Figure 16:
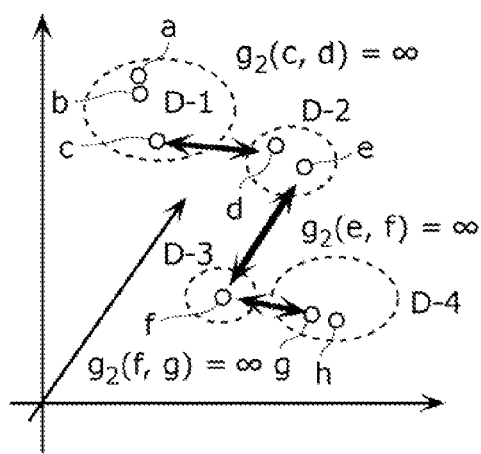

Next, the trajectories are classified into subclasses by detecting a discontinuity point using g(i, j) resulting from geodetic distance conversion and corresponding to the threshold R, to assign the subclass labels. Here, the discontinuity point is where g(i, j) is infinite between the trajectory i and the trajectory j. An example of a result of the geodetic distance conversion which is obtained with respect to the threshold R is described with reference to FIG. 16. Here, FIG. 16(a) is a diagram showing trajectories a to h calculated in Step S402. FIG. 16(b) is a conceptual diagram of a higher-dimensional space including the trajectories a to h shown in FIG. 16(a). The number of trajectories are eight here, however, the number is not limited to eight. In practice, trajectories corresponding to the respective pixels may be used, or trajectories calculated on a per-block basis may be used. Here, each point in the higher-dimensional space 1502 including trajectories corresponds to different one of the trajectories shown in Expression 1 above. That is, each of the points in the higher-dimensional space is a result of tracking a pixel not only in a region on a single picture but also over temporally different pictures. In addition, on the higher-dimensional space 1502, a point-to-point distance does not correspond to the Euclidean distance between vectors, but corresponds to the geodetic distance as expressed in Expression 16.

Figure 17:
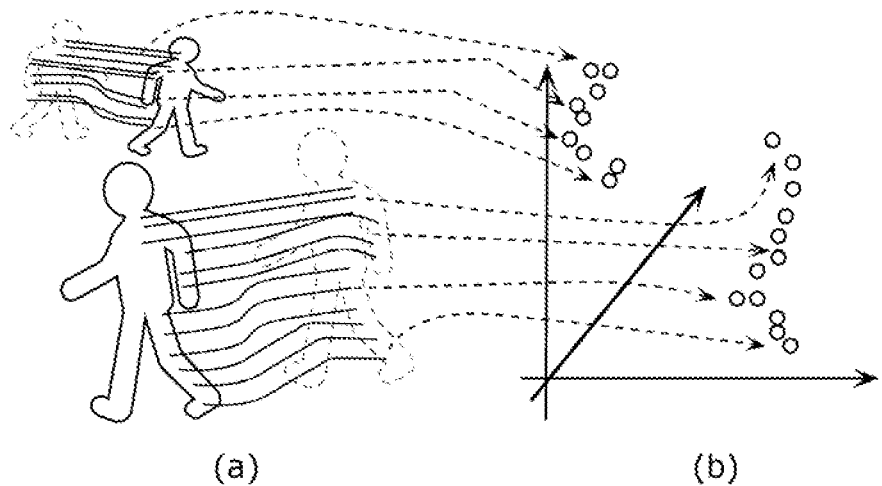
FIG. 17 is a diagram which illustrates an example of processing performed by a subclass label assigning unit according to Embodiment 3.
Figure 17:
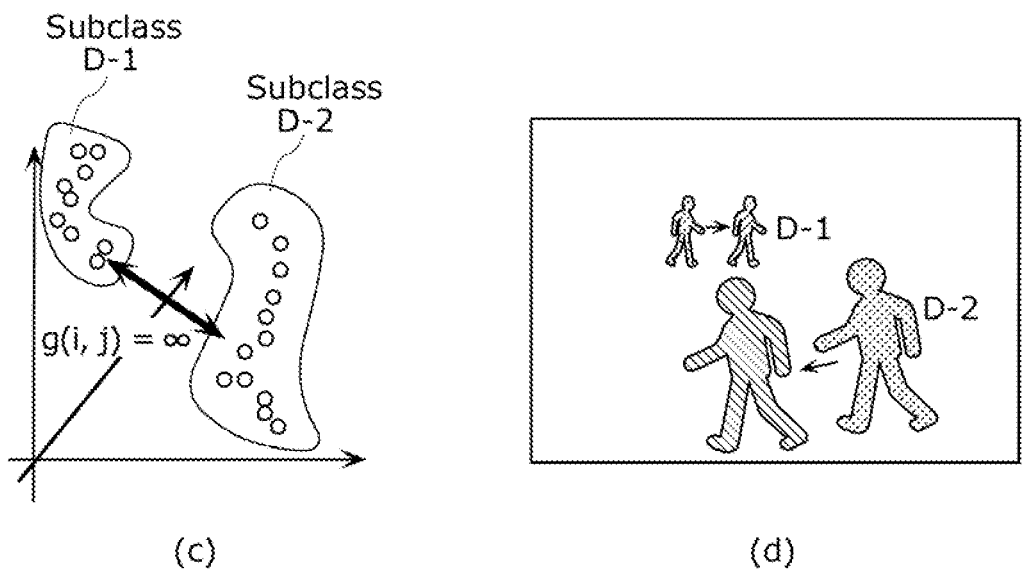

FIG. 16(c) is a diagram which shows a result of clustering. Here, in FIG. 16(c), f(e, f)>f(c, d)>f(f, g)>R>f(b, c) where f(a, b) is the distance between the trajectory a and the trajectory b as expressed by Expression 10. Here, it is assumed that when the threshold is set as R, the distance f(f, g) has a larger value than the threshold R. In this case, even when calculating the geodetic distance according to Expression 15, each of g(e, f), g(c, d), and g(f, g) is infinite. Thus, the subclass label assigning unit 203b determines that discontinuity points are present between: the trajectories c and d, the trajectories e and f, and the trajectories f and g. As a result, the trajectories a, b, and c do not take infinite values because each of them can be tracked without passing through a discontinuity point; in contrast, for example, the trajectories a, b, and c take infinite values because they pass through the discontinuity point g(c, d) of the geodetic distance, from the trajectories a, b, and c to the other trajectories. As described above, it is determined that the group of the trajectories i and j whose geodetic distance is not infinite belongs to the same subclass and that the group of the trajectories i and j whose geodetic distance is infinite belongs to different subclasses. Then, the trajectories can be separated into a total of four subclasses D-1, D-2, D-3, and D-4 by sorting out the groups whose geodetic distance is not infinite from the groups whose geodetic distance is infinite. Here, the property of the threshold R is described. When the threshold R is smaller, there is a trade-off that a smaller moving object can be detected on the image while false detection (false positive) increases. Thus, when it is previously known what range is intended for the detection of the moving object, for example, for monitoring purpose and so on, the threshold R may be set according to a smallest size and motion on the image of the moving object intended for the detection. In addition, although an example of finely classifying a moving object into subclass is described here, the threshold R may be set to be a higher value so as to respectively separate plural moving objects as shown in FIG. 17. For example, in the case where two moving objects are present in video and plural trajectories are obtained as shown in FIG. 17(a), the higher-dimensional space is depicted as shown in FIG. 17(b). The geodetic distance g(i, j) between different moving objects is infinite as shown in the result of clustering in FIG. 17(c), by setting the threshold R to a value higher than a value of threshold. R that is set for separating parts of a single moving object, and thus it is possible to separate two moving objects as shown in FIG. 17(d).

With the processes described above, it is possible to determine that the groups of trajectories not having an infinite geodetic distance are continuous and thus belong to the same subclass, and to separate the trajectories into subclasses based on the discontinuity point by determining that the groups of trajectories having infinite distance are discontinuous. In other words, each trajectory is assigned with a label of the subclass D-s as with the process in the subclass label assigning step S403 according to Embodiment 1.

Since the processes in and subsequent to the label propagation and update step S404 are the same as those in Embodiment 1, the description thereof will be omitted.

As described above, it is possible to detect a moving object in an image based on the trajectories even under the crowded circumstance in which occlusion is likely to occur, according to Embodiment 3. It is to be noted that, in this exemplary embodiment, since similar trajectories are classified into the same subclass based on the geodetic distance, the difference between the motion of a head region and the motion of arms and the difference between the motion of upper thighs and the motion of lower thighs are reflected in the example shown in FIG. 16, and thus it is possible to classify the head region, the arms, the upper thighs, and the lower thighs into different subclasses. The result of the above is used in the label propagation and update, thereby allowing integration of the subclasses as classes temporally maintaining coherence. In addition, this method allows, in the same manner as above, detecting each moving object in a scene in which more than one person is present.

As described above, it is possible to properly detect and extract a moving object even under the circumstance in which occlusion is likely to occur, while solving occlusion that occurs due to an imaging position of a camera and erroneous detection of which one moving object is separated into plural portions.

Thus, today, with video capturing apparatuses such as a digital video camera becoming widely used, the present disclosure provides an extremely high practical value as technology applied to: focus control and image quality improvement processing in digital cameras; a driving safety support system for vehicles; or collision avoidance control to avoid collision against a person and alarming using a robot.

Embodiment 4

Next, a moving object detection apparatus according to Embodiment 4 of the present disclosure will be described.

Figure 18:
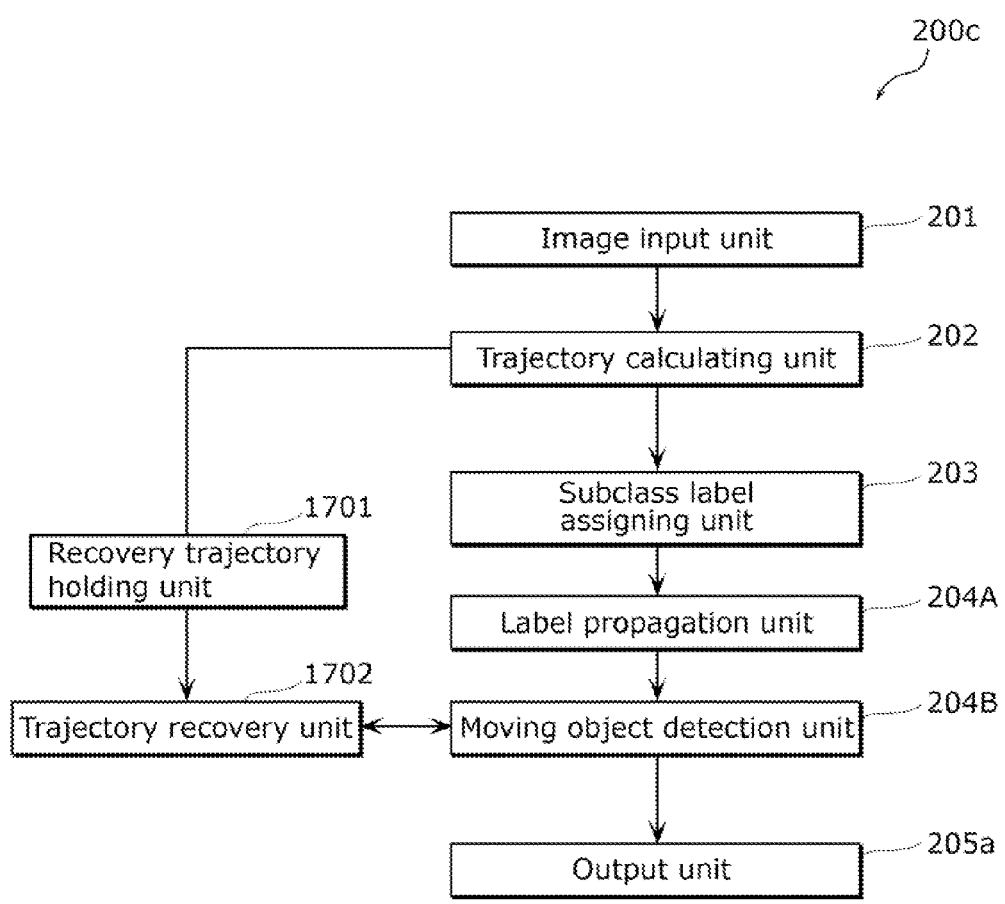
FIG. 18 is a diagram which illustrates a basic configuration of a moving object detection apparatus according to Embodiment 4.

FIG. 18 is a diagram which illustrates a configuration of a moving object detection apparatus 200c according to Embodiment 4. The moving object detection apparatus 200c according to Embodiment 4 includes: an image input unit 201; a trajectory calculating unit 202; a subclass label assigning unit 203; a label propagation unit 204A; a moving object detection unit 204B; a recovery trajectory holding unit 1701; a trajectory recovery unit 1702; and an output unit 205

The moving object detection apparatus 200c according to Embodiment 4 has the same configuration as the configuration of the moving object detection apparatuses according to Embodiment 1 to Embodiment 3 except for the recovery trajectory holding unit 1701 and the trajectory recovery unit 1702, and thus the description of the same constituent elements will be omitted It is to be noted that, although the description will be given as Embodiment 1 being the basic form, this exemplary embodiment can also be applied to Embodiment 2 and Embodiment 3 without loss of generality.

It is to be noted that, although the subclass label assigning unit 203 is included in the subclass classification unit 213 illustrated in FIG. 2, illustration of the subclass classification unit 213 is omitted in this diagram. In addition, although the label propagation unit 204A is included in the inter-subclass similarity calculating unit 214A illustrated in FIG. 2, illustration of the inter-subclass similarity calculating unit 214A is omitted in this diagram.

The recovery trajectory holding unit 1701 is a storage device which holds, from among the trajectories calculated by the trajectory calculating unit 202, trajectories that are calculated using fewer pictures than the pictures included in an image subset The trajectory recovery unit 1702 classifies the trajectories held in the recovery trajectory holding unit 1701 into the same class to which other trajectories continuous to the trajectories held in the recovery trajectory holding unit 1701 belong.

It is to be noted that, the moving object detection unit 204B identifies, as a region of a moving object, blocks which correspond to the trajectories included in the same class, among the trajectories classified by the trajectory recovery unit 1702, in addition to the processes described in Embodiment 1, thereby detecting the moving object in video.

More specifically, the trajectory recovery unit 1702, from among trajectories in subclass pairs between temporally adjacent image subsets which are determined as being in the same class by the moving object detection unit 204B, assigns the same label as a label of the subclass pairs determined as being in the same class, to trajectories of F pictures on which motion detection cannot be performed due to occlusion or the like. Then, the recovery trajectory holding unit 1701 holds the trajectories which cannot be calculated for F pictures which are temporally short and which are used in the process performed by the trajectory recovery unit 1702. Through the processes described above, the moving object detection unit 204B assigns labels to more trajectories, thereby detecting and extracting a moving object with higher accuracy. In general, when the similarity or a distance between trajectories is calculated, it is necessary that the vectors have the same length. Meanwhile, in this exemplary embodiment, the similarity is not calculated for trajectories of which the number of elements of the vector is less than a certain value, and class information obtained through the process performed by the moving object detection unit 204B is used instead to assign a label. With this, more trajectories are used to detect and extract a moving object.

Figure 19:
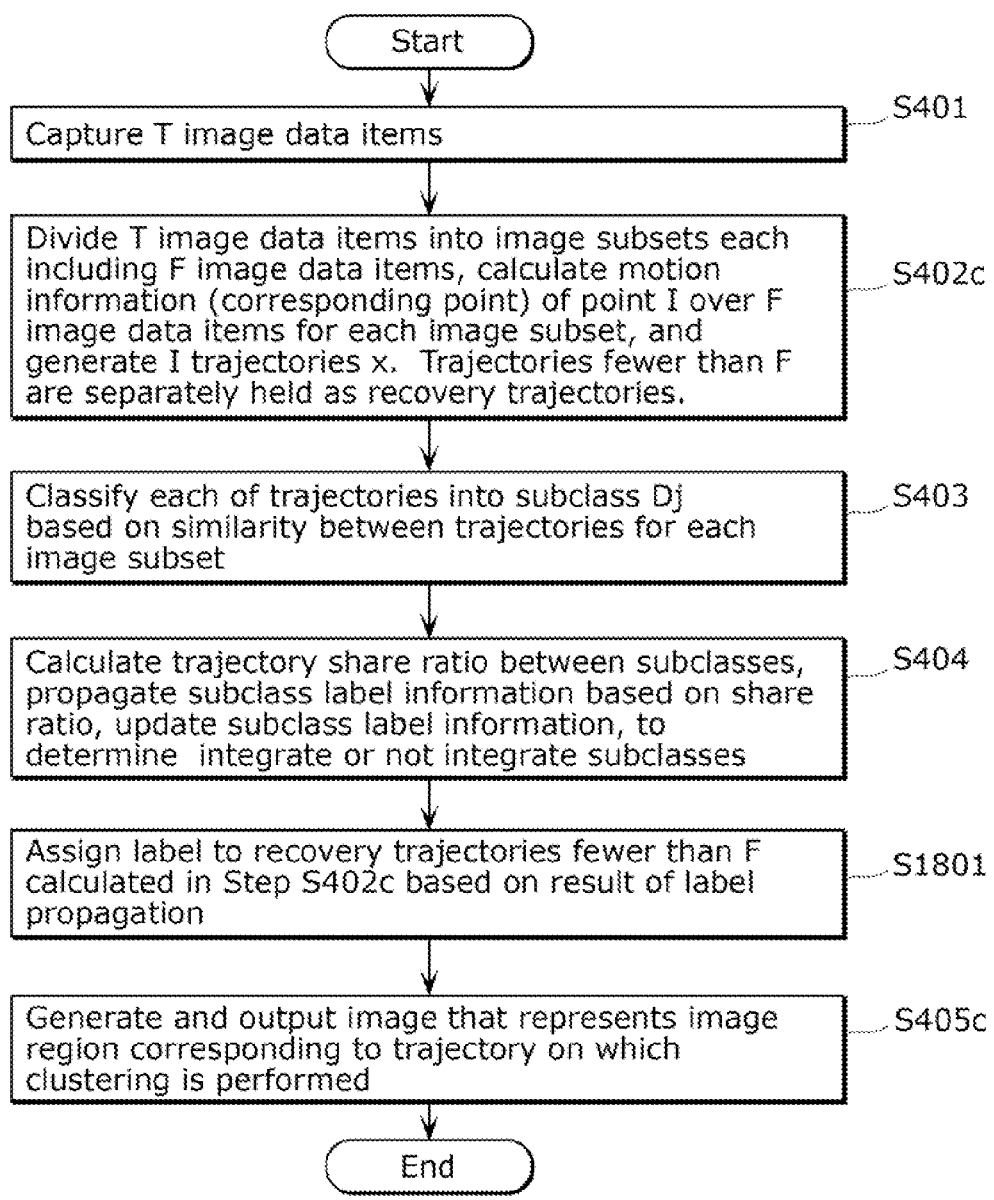
FIG. 19 is a flowchart which illustrates a basic operation performed by the moving object detection apparatus according to Embodiment 4.

Hereinafter, an operation performed by the moving object detection apparatus 200c according to Embodiment 4 will be described with reference to FIG. 19. Since Steps S401, S403 and S404 are the same as those in Embodiment 1, the description thereof will be omitted.

In a trajectory calculating step S402c, the trajectory calculating unit 202 calculates a trajectory as expressed in Expression 1 as described in Embodiments 1 to 3. Here, there is the case where a trajectory in F images included in an image subset cannot be calculated due to occlusion or the like. In view of such a case, a trajectory in images fewer than F is separately held, as a recovery trajectory, in the recovery trajectory holding unit 1701. In addition, although the example of calculating a trajectory in the forward direction as in the direction from time (t+1) to time (t+F) is explained in Embodiments 1 to 3, the trajectory here is calculated, for example, separately in the reverse direction from time (t+F) to time (t+1).

Next, in a trajectory recovery step S1801, the trajectory recovery unit 1702 assigns class label information to the recovery trajectories held in the recovery trajectory holding unit 1701, using information on the subclass calculated from temporally different image subsets which are integrated into the same class in the label propagation and update step S404. It is to be noted that, the moving object detection unit 204B identifies, as a region of a moving object, blocks which correspond to the trajectories included in the same class, among the trajectories classified by the trajectory recovery unit 1702, thereby detecting the moving object in video.

Figure 20:
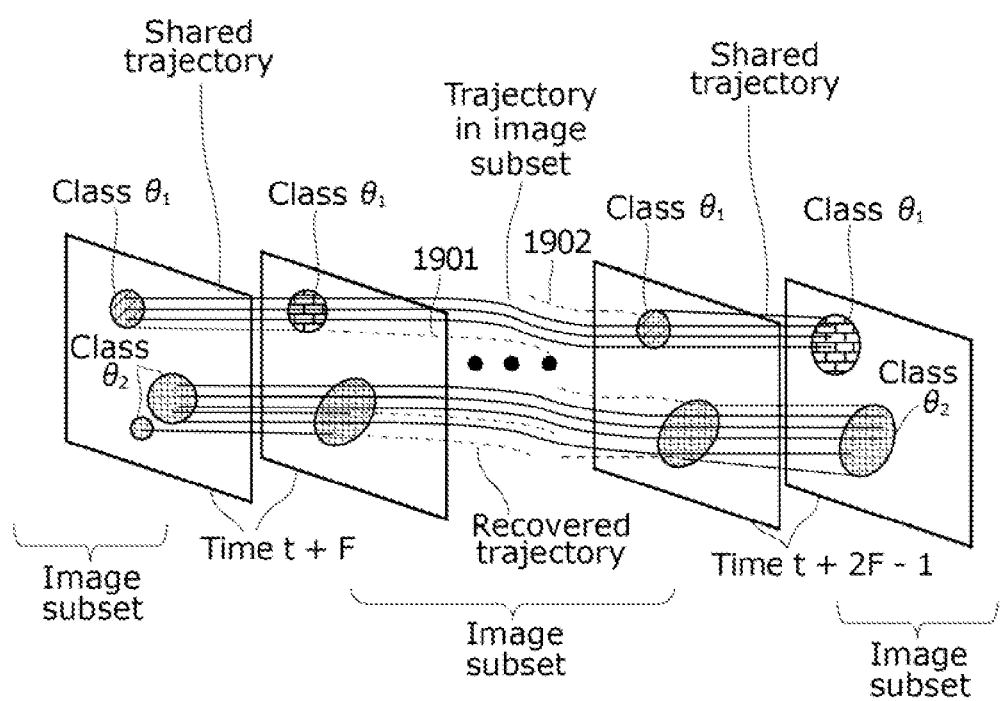
FIG. 20 is a diagram which illustrates an example of processing performed by a trajectory recovery unit according to Embodiment 4.

FIG. 20 illustrates an example of assigning class label information to the recovery trajectories, using three image subsets. It is sufficient here that there are two or more image subsets, and the number of image subsets is not limited. In the label propagation and update step S404, it is determined that whether or not the subclasses between different image subsets belong to the same class. In the diagram, classes depicted by the same texture are the same classes. Here, the trajectory recovery unit 1702 assigns a new class label to each of the recovery trajectories calculated in the trajectory calculating step S402c in the image subset in the center of FIG. 20 Here, the trajectories indicated by broken lines in FIG. 20 are the recovery trajectories, class labels of the class $\theta_1$ and the class $\theta_2$ are respectively assigned to the recovery trajectories. To be more specific, the recovery trajectories in the image subset are assigned with the class labels (the class labels $\theta_1$ and $\theta_2$ in the diagram) obtained from the immediately previous image subset. The recovery trajectories are connected to trajectories obtained from the immediately previous image subset. The number of class labels is of course not limited. For example, the recovery trajectory 1901 is connected to a trajectory in a class assigned with the class label $\theta_1$ obtained from the immediately previous image subset. Therefore, the recovery trajectory 1901 is assigned with the class label $\theta_1$.

In the same manner as above, the recovery trajectories connected to the trajectories obtained from an immediately subsequent image subset are assigned with the class labels obtained from the immediately subsequent image subset. For example, the recovery trajectory 1902 is connected to a trajectory in a class assigned with the class label $\theta_1$ obtained from the immediately subsequent image subset. Therefore, the recovery trajectory 102 is assigned with the class label $\theta_1$.

Accordingly, labels can be assigned to the trajectories over fewer than F images because the labels are assigned in the label propagation and update step S404 such that a class label obtained from temporally adjacent image subsets and a class label from a current image subset temporally maintain coherence. As described above, the labels can be assigned to the trajectories with higher density compared to Embodiments 1 to 3, and as a result, it is possible to detect and extract a moving object with higher accuracy. In addition, there is an advantageous effect that the moving object can be extracted with higher precision.

Next, in the image outputting step S405c, the output unit 205 performs output including the result of detecting the moving object in the video performed in the trajectory recovery step S1801. More specifically, image processing is performed on the video received in the image inputting step S401 so as to be displayed, for example, in a different mode per moving object region detected in the label propagation and update step S404 and the trajectory recovery step S1801, and the image on which the image processing is performed is output to a display apparatus or the like. Through the processes described above, it is possible to perform display while temporally maintaining coherence and distinguishing the respective moving objects.

As described above, it is possible to properly detect and extract a moving object even under the circumstance in which occlusion is likely to occur, while solving occlusion that occurs due to an imaging position of a camera and erroneous detection of which one moving object is separated into plural portions. In addition, since it is difficult to calculate a trajectory in a long time period under the circumstance in which occlusion is likely to occur, labels are also assigned to trajectories in a short time period as described above, thereby enabling the detection of a moving object with higher precision, Thus, today, with video capturing apparatuses such as a digital video camera becoming widely used, the present disclosure provides an extremely high practical value as technology applied to: focus control and image quality improvement processing in digital cameras; a driving safety support system for vehicles; or collision avoidance control to avoid collision against a person and alarming using a robot.

[Modification 1 of Embodiments 1 to 4]

Figure 21:
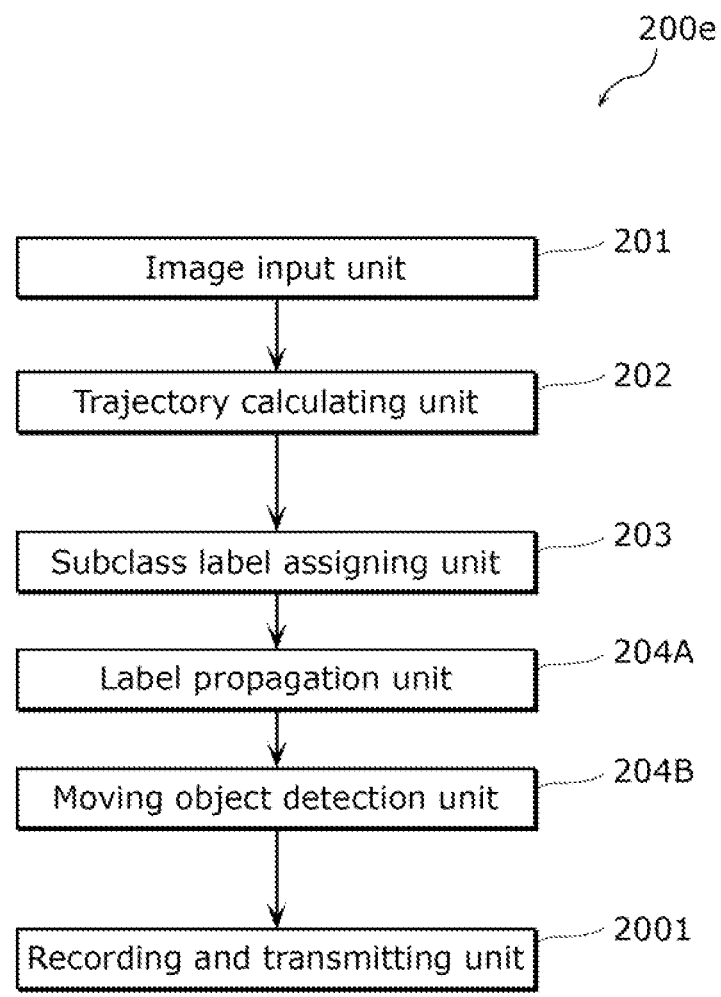
FIG. 21 is a diagram which illustrates a basic configuration of a moving object detection apparatus according to a first modification of Embodiments 1 to 4.

Next, a moving object detection apparatus according to Modification 1 of Embodiments 1 to 4 will be described. Here described is an example of adding a function of recording and transmitting of the result of detecting a moving object for each detected region after the class determination performed in Embodiments 1 to 4. Here, a modification example of Embodiment is described, but the modification is also applicable to Embodiments 2 to 4. The moving object detection apparatus 200e according to Modification 1 can be implemented by including a recording and transmitting unit 2001 in addition to the image input unit 201, the trajectory calculating unit 202, the subclass label assigning unit 203, the label propagation unit 204A, and the moving object detection unit 204B, as illustrated in FIG. 21.

It is to be noted that, although the subclass label assigning unit 203 is included in the subclass classification unit 213 illustrated in FIG. 2, illustration of the subclass classification unit 213 is omitted in this diagram. In addition, although the label propagation unit 204A is included in the inter-subclass similarity calculating unit 214A illustrated in FIG. 2, illustration of the inter-subclass similarity calculating unit 214A is omitted in this diagram.

The recording and transmitting unit 2001 writes, in a recording device, the result of detecting a moving object performed by the moving object detection unit 204B, or transmits the result to an external device via a transmission path. More specifically, the recording and transmitting unit 2001 is a processing unit which identifies a moving object region in the picture received by the image input unit 201 based on the result of detecting a moving object performed by the moving object detection unit 204B, and, for each of the identified moving object regions, records information that indicates the moving object region on a recoding medium such as a memory, hard disk, as so on, or transmits the information to an external device via a communication interface, and the like. In other words, the recording and transmitting unit 2001 separately records or transmits the information that indicates the image resulting from detecting the moving object, according to the class label θ, as with the case of the image display. In addition, by averaging motion information that belongs to each of the classes as below, it is also possible to compress the motion information. Although it is normally necessary to hold motion information for of the each pixels, holding one motion for one moving object is sufficient if the following process is performed. For example, when the motion vector $(u_t^i, v_t^i)$ of the pixel i is used as motion information, it is possible to calculate averaged motion information for each of the regions resulting from segmentation as below.

[Math. 17]

$$u_t^m = \frac{1}{C_m} \sum_{c_m=1}^{C_m} u_t^{c_m}$$ Expression 17

[Math. 18]

$$v_t^m = \frac{1}{C_m} \sum_{c_m=1}^{C_m} v_t^{c_m}$$ Expression 18

Here, $C_m$ is the number of trajectories that belong to the class $θ_m$. The $u_t^{cm}$ and $v_t^{cm}$ are the x component and the y component, respectively, of the motion vector of a pixel that belongs to the class $θ_m$. FIG. 22 shows, as one result of the process according to this modification example, an example of performing classification with T images from time t being the input, and recording or transmitting an extracted region of a moving object using the result. Each class label $θ_m$ as an identifier; a pixel position and a pixel value of the picture at time t which belongs to each of the class labels $θ_m$; and a motion vector $u_t^m, v_t^m, u_{t+i}^m, v_{t+i}^m, \ldots, u_{t+T}^m, v_{t+T}^m$, from time t to time (t+T) corresponding to each of the class labels are recorded or transmitted. Naturally, instead of using the pixel position and the pixel value of the image, a picture at time t may be assigned with a class label per pixel and be transmitted. This only requires transmitting of the motion information for the number of classes, thus producing an advantageous effect of allowing more efficient recording or transmitting of the result of detecting a moving object, compared to the case where T pictures are transmitted. Particularly, the smaller the number of the classes is, the more efficient the recording or transmission is.

[Modification 2 of Embodiments 1 to 4]

The following describes, as Modification 2 of Embodiments 1 to 4, the moving object detection apparatus that additionally has a function to predict the motion of a moving object based on the result of detecting the moving object. Here, the description will be given according to Embodiment 1, but the moving object detection apparatus can also be implemented according to Embodiments 2 to 4.

Figure 23:
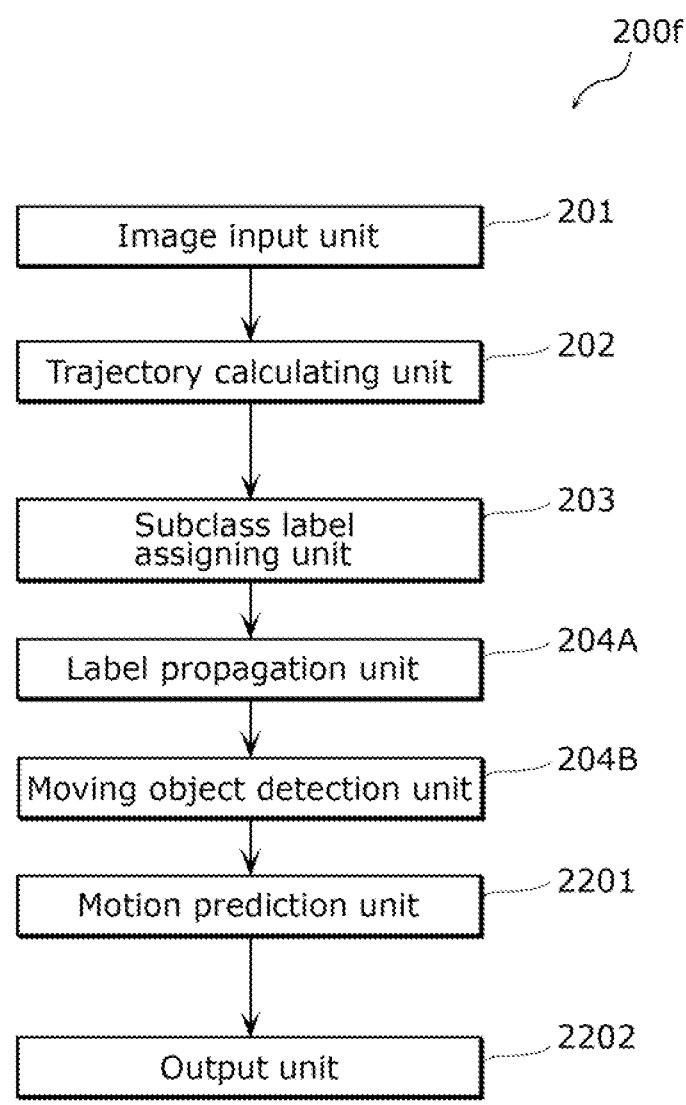
FIG. 23 is a diagram which illustrates a configuration of a moving object detection apparatus according to a second modification of the Embodiments 1 to 4.

As shown in FIG. 23, the moving object detection apparatus 200f according to this modification example, has a function of predicting the motion of a moving object, by including a motion prediction unit 2201 and an output unit 2202 in addition to an image input unit 201, a trajectory calculating unit 202, a subclass label assigning unit 203, a label propagation unit 204A, and a moving object detection unit 204B.

It is to be noted that, although the subclass label assigning unit 203 is included in the subclass classification unit 213 illustrated in FIG. 2, illustration of the subclass classification unit 213 is omitted in this diagram. In addition, although the label propagation unit 204A is included in the inter-subclass similarity calculating unit 214A illustrated in FIG. 2, illustration of the inter-subclass similarity calculating unit 214A is omitted in this diagram.

The motion prediction unit 2201 calculates a representative trajectory from trajectories of pixels included in each of the classes, based on the result of detecting a moving object, and predicts motion of the moving object based on the representative trajectory. More specifically, the motion prediction unit 2201 calculates a representative trajectory that represents the class, from among the trajectories included in the class that is identified by the moving object detection unit 204B, and predicts that a region of the moving object which corresponds to the class moves between pictures according to the calculated representative trajectory, thereby predicting the motion of the moving object.

Figure 24:
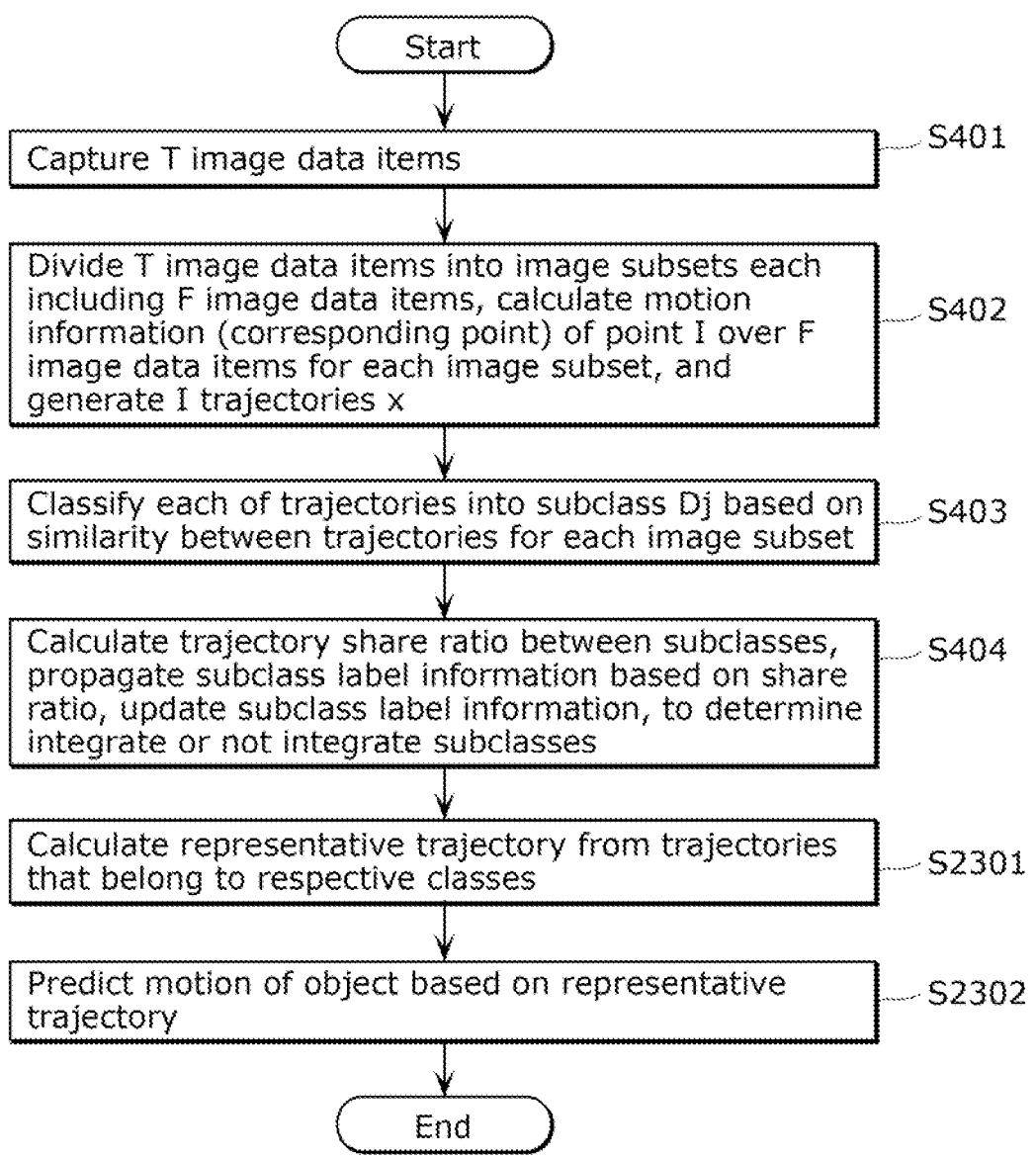
FIG. 24 is a flowchart which illustrates a basic operation performed by the moving object detection apparatus according to the second modification of the Embodiments 1 to 4.

FIG. 24 is a flowchart which shows the processes performed in this modification example. Since Steps S401 to S404 are the same as in Embodiment 1, the description thereof will be omitted.

Next, in step S2301, the motion prediction unit 2201 calculates, from the trajectories that belong to the respective classes, a representative point of the class and a representative trajectory of the representative point, based on the result of detecting a moving object performed by the moving object detection unit 2048.

Here, trajectories of pixels that belong to the class $θ_m$ are represented as $x^{cm}$. A representative trajectory is calculated for each of the classes $θ_m$ as the following Expression. Here, an example of calculating an average trajectory as the representative trajectory is described, but weighting or the like may be performed for each of the trajectories $X^{C_m}$ with respect to the calculation below, or the trajectory of the pixel corresponding to a centroid of a class on the image may be determined as the representative trajectory.

[Math. 19]

$$\overline{x^m} = \frac{1}{C_m} \sum_{c=1}^{C_m} x^{c_m}$$ Expression 19

Here, $C_m$ is the number of pixels that belong to the class $θ_m$ or the number of trajectories of the pixels.

Figure 25:
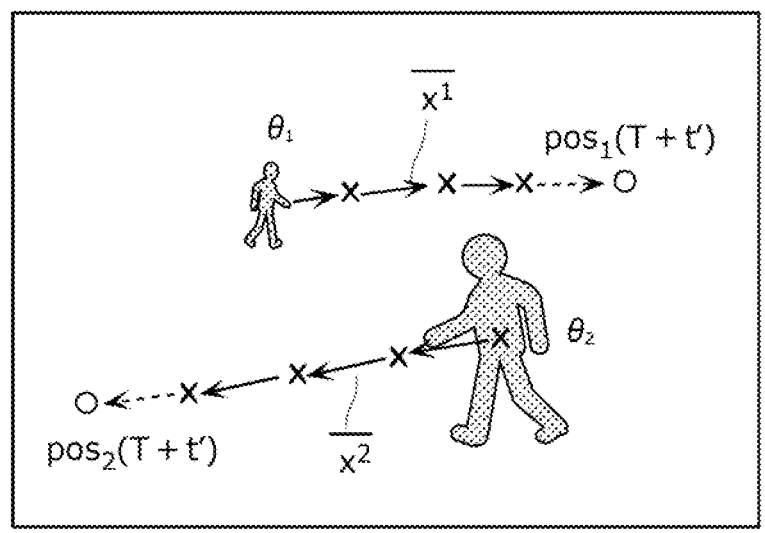
FIG. 25 is a diagram which illustrates an example of motion prediction according to the second modification of the Embodiments 1 to 4.

FIG. 25 shows an example of calculating the representative trajectory for each of the classes $θ_m$, based on Expression 19. FIG. 25 only shows a representative trajectory for each of a class $θ_1$ corresponding to a certain moving object and a class $θ_2$ corresponding to another moving object.

$$\overline{x^m}$$ [Math. 20]

Each of the denotations "x" in the diagram indicates a pixel posit on that is an element of the representative trajectory corresponding to time t According to this method, as compared to the method of simply calculating a temporal average of trajectories of an adjacent pixel, it is possible to calculate the representative trajectory using only the trajectory of the pixel that is similar in motion. According to this, it is possible to calculate the representative trajectory with higher accuracy. As described above, by calculating the representative trajectory for each of the classes, it is possible to represent, accurately and easily, the motion of each imaging object or the motion of each part.

Next, in Step S2302, the motion prediction unit 2201 predicts the position of the moving object at a time earlier than time T, from the representative trajectory calculated in Step S2301. First, an example of calculating acceleration from the representative trajectory, and predicting the position of the moving object subsequent to time (T+1) is described. When three or more time-series images are inputted, it is possible to obtain an acceleration vector $s^m$ for each representative trajectory as expressed in the following Expression 20.

$$\overline{x^m}$$ [Math. 21]

[Math. 22]

$$s_{t+1}{}^m = \{u_{t+1}{}^m - u_t{}^m\} - \{u_t{}^m - u_{t-1}{}^m\}$$  Expression 20

Here, $u_t{}^m$ is a motion vector of a pixel m at time t, and can be represented as Expressions 21 below.

[Math. 23]

$$u_t{}^m = (u_t{}^m, v_t{}^m)$$  Expression 21

As shown by dashed arrows and circles in FIG. 25, the motion prediction unit 2201, using the acceleration vector in Expression 20, is capable of predicting, for each of the moving objects, $pos_m(T+t')$ that is the position of the moving object at time (T+t') according to Expression 22 below.

[Math. 24]

$$pos_m(T+t') = pos_m(T) + t'u_T^m + \frac{1}{2}t'^2 s_T^m$$  Expression 22

Then, the output unit 2202 outputs the position of the moving object or the position of the part of the moving object that is predicted in step S2301. With this, it is possible to perform motion prediction taking acceleration into consideration. In such a case where the motion suddenly becomes quick or suddenly stops, there is an advantageous effect of allowing predicting the position of the moving object by reflecting the acceleration. In addition, an affine parameter may be used instead of the motion vector. Since the affine parameter allows representing motion which includes rotation and is appropriate for representing rotational movement of an arm or a leg, it is possible to correctly predict, in particular, the position of an articulated object.

In addition, instead of the motion vector and acceleration described above, it is also possible to fit an Nth-order function directly to the representative trajectory xm. When temporally sequential T images are input, the Nth-order function can be fit to T items of position information on the images, which are included in the representative trajectory.

$$\overline{x^m}$$ [Math. 25]

With this, it is possible to estimate the position $pos_m(T+t')$ on the image at time (T+t') according to the fitted function value. More specifically, since fitting of the function allows representing smoother movement, it is possible to perform motion estimation with higher accuracy, In particularly, since this allows motion prediction according to the fitted function, the motion prediction is more accurate when the fitted function is closer to an original motion. Naturally, the position prediction on these images is also applicable to temporal interpolation.

As described above, according to this modification example, the trajectories of the pixels which have similar motions can be calculated as the same class, thus it is possible to obtain the representative trajectory with high accuracy.

Thus far, the moving object detection method and the moving object detection apparatus according to the present disclosure have been described based on the exemplary embodiments and the exemplary modifications thereof, the present disclosure is not limited to these exemplary embodiments and exemplary variations. Those skilled in the art will readily appreciate that many modifications are possible in the exemplary embodiments without departing from the novel teachings and advantages of this disclosure. Accordingly, all such modifications are intended to be included within the scope of this disclosure.

In addition, the present disclosure also includes a mode realized by an arbitrary combination of characteristic constituent elements in each of the embodiments.

In addition, the moving object detection apparatus in the embodiments above includes the image input unit 201 and the trajectory calculating unit 202, but these constituent elements are not essential according to the present disclosure. In other words, when trajectories of images in each of the plurality of blocks included in the video are previously calculated, the moving object detection apparatus 200 may obtain such trajectories from an external device, and perform the processing in steps S403 and S406 on the obtained trajectories.

In addition, each of the moving object detection apparatus according to the embodiments described above includes the output unit 205 or 205*a*, however, the output unit is not essential according to the present disclosure. To be more specific, the result of detecting a moving object may be used for other processing instead of displaying the result on a display or the like.

In addition, the present disclosure has been realized as a moving object detection apparatus, but it goes without saying that the present disclosure can be realized as an image processing device which extracts or divide a region of an object having motion in video.

Each of the structural elements in each of the above-described embodiments may be configured in the form of an exclusive hardware product, or may be realized by executing a software program suitable for the structural element. Each of the structural elements may be realized by means of a program executing unit such as a CPU and a processor, as shown in FIG. 3, reading and executing the software program recorded on a recording medium such a hard disk or a semiconductor memory, Here, the software program for realizing the moving object detection apparatus according to each of the embodiments is a program described below.

The program causes a computer to execute each of the steps included in a moving object detection method. The moving object detection method is a method of detecting a moving object in video by performing segmentation to identify an entire or partial region of the moving object in the video, and includes: receiving at least three pictures included in the video; extracting, from among the at least three pictures, image subsets each including at least two of the pictures, and calculating, for each of the image subsets, trajectories each of which is a trajectory of motion of a block, between the pictures included in the image subset, the block including one or more pixels and being included in each of the pictures; classifying, for each of the image subsets, the calculated trajectories into subclasses, the calculated trajectories being included in the image subset; calculating a trajectory share ratio which indicates a degree of sharing a same trajectory between two of the subclasses, and calculating a similarity between the two of the subclasses based on the trajectory share ratio; and detecting the moving object in the video by classifying the subclasses into classes such that the subclasses between which the calculated similarity is higher are more likely to be classified into the same class, to identify, as the region of a moving object, the blocks which correspond to the trajectories included in a same class.

INDUSTRIAL APPLICABILITY

The present disclosure is applicable as a moving object detection apparatus which detects, based on motion in a plurality of pictures, a moving object in video by performing region extraction on an image that includes the moving object that moves changing shape such as a person, for example, as a moving object detection apparatus and the like that is to be incorporated in, for example, a motion analysis apparatus, a monitoring apparatus, and an audio-visual device such as a video camera or a television set.

The invention claimed is:

1. A moving object detection apparatus which detects a moving object in video by performing segmentation to identify an entire or partial region of the moving object in the video, the moving object detection apparatus comprising:
an image input unit configured to receive at least three pictures included in the video;
a trajectory calculating unit configured to (i) extract, from among the at least three pictures, image subsets each including at least two of the pictures, and (ii) calculate, for each of the image subsets, trajectories each of which is a trajectory of motion of a block, between the pictures included in the image subset, the block including one or more pixels and being included in each of the pictures;
a subclass classification unit configured to classify, for each of the image subsets, the trajectories into subclasses, the trajectories being included in the image subset and calculated by the trajectory calculating unit;
an inter-subclass similarity calculating unit configured to (i) calculate a trajectory share ratio which indicates a degree of sharing a same trajectory between two of the subclasses, and (ii) calculate a similarity between the two of the subclasses based on the trajectory share ratio; and
a moving object detection unit configured to detect the moving object in the video by classifying the subclasses into classes such that the subclasses between which the similarity calculated by the inter-subclass similarity calculating unit is higher are more likely to be classified into the same class, to identify, as the region of a moving object, the blocks which correspond to the trajectories included in a same class.

2. The moving object detection apparatus according to claim 1,
wherein the subclass classification unit includes a subclass label assigning unit configured to (i) classify, for each of the image subsets, the trajectories which are included in the image subset and calculated by the trajectory calculating unit, into the subclasses, and (ii) assign, to each of the trajectories, a subclass label that is an identifier of a corresponding one of the subclasses into which the trajectory is classified,
the inter-subclass similarity calculating unit includes a label propagation unit configured to propagate the subclass label between the subclasses by (i) calculating the trajectory share ratio which indicates a degree of sharing a trajectory indicating motion of a same block between a first subclass and a second subclass which are arbitrarily selected from among all of the subclasses, and (ii) reassigning the subclass label such that the first subclass and the second subclass between which the trajectory share ratio is higher are more likely to be reassigned with the same subclass label, and
the moving object detection unit is configured to detect the moving object in the video by classifying, into the same class, the subclasses to which the same subclass label is assigned, to identify, as the region of the moving object, the blocks which correspond to the trajectories included in the same class.

3. The moving object detection apparatus according to claim 2,
wherein the trajectory calculating unit is configured to (i) extract the image subsets from among the at least three pictures such that some of the pictures are shared between temporally adjacent image subsets, and (ii) calculate, for each of the image subsets, trajectories each of which is a trajectory of motion of a block, between the pictures included in the image subset, the block including one or more pixels and being included in the pictures, and
the label propagation unit is configured to propagate the subclass label between the subclasses by (I) determining that the trajectory share ratio between the first subclass and the second subclass is higher as a ratio of a trajectory passing a same position in the pictures shared between the first subclass and the second subclass to the trajectories included in the first subclass and the second subclass is higher, and (ii) reassigning the subclass label such that the first subclass and the second subclass between which the trajectory share ratio is higher are more likely to be reassigned with the same subclass label.

4. The moving object detection apparatus according to claim 2,
wherein the label propagation unit is further configured to propagate the subclass label between the subclasses by performing reassigning such that the same subclass label as the subclass label assigned by the subclass label assigning unit is more likely to be reassigned to the subclass which is higher in reliability that is a value corresponding to the number of trajectories included in the subclass or a spatial size of a region including trajectories included in the subclass.

5. The moving object detection apparatus according to claim 2, further comprising:
a holding unit configured to hold, from among the trajectories calculated by the trajectory calculating unit, trajectories which are calculated using fewer pictures than the pictures included in the image subset; and
a trajectory recovery unit configured to classify the trajectories held in the holding unit into a same class as a class to which other trajectories continuous to the trajectories held in the holding unit belong,
wherein the moving object detection unit is further configured to detect the moving object in the video by identifying, as the region of the moving object, blocks which correspond to the trajectories included in the same class, the trajectories including the trajectories classified by the trajectory recovery unit.

6. The moving object detection apparatus according to claim 2,
wherein the subclass label assigning unit is configured to classify, for each of the image subsets, the trajectories which are included in the image subset and calculated by the trajectory calculating unit, into subclasses by classifying similar trajectories from among the trajectories into the same subclass, and assign, to each of the trajectories, a subclass label which is an identifier of the subclass into which the trajectory is classified.

7. The moving object detection apparatus according to claim 6,
wherein the subclass label assigning unit is configured to classify, for each of the image subsets, the trajectories into the subclasses, by performing a process of classifying, into a same subclass, a combination of most similar trajectories from among the trajectories which are included in the image subset and calculated by the trajectory calculating unit, repeatedly for predetermined times or until the trajectories are classified into a predetermined number of subclasses, and assign, to each of the trajectories, a subclass label which is an identifier of the subclass into which the trajectory is classified.

8. The moving object detection apparatus according to claim 6,
wherein the subclass label assigning unit is configured to (i) classify the trajectories calculated by the trajectory calculating unit into subclasses, by (a) calculating a distance that indicates the similarity between the trajectories, (b) combining, from among the calculated distances, distances each of which is shorter than a predetermined threshold, to transform the calculated distances into geodetic distances, and (c) calculating, for each of the image subsets, a geodetic distance of two arbitrary trajectories from among the trajectories which are included in the image subset and calculated by the trajectory calculating unit, detecting a discontinuity point in a distribution of the obtained geodetic distances, sorting out, as one cluster, trajectories which are spaced apart from each other by the geodetic distance shorter than the detected discontinuity point, to classify the trajectories into subclasses, and (ii) assign, for each of the trajectories, a subclass label that is an identifier of the subclass into which the trajectory is classified, the geodetic distance being a distance of a path that passes through, as a relay point, a trajectory other than the arbitrary two trajectories, from one of the two trajectories to the other.

9. The moving object detection apparatus according to claim 2,
wherein the subclass label assigning unit is configured to divide, for each of the image subsets, at least one image into a plurality of regions, using at least one of edge, color, and brightness of the at least one image, to generate subclasses, and assign a subclass label to each of the trajectories that pass through the regions resulting from the division, the at least one image being included in the image subsets.

10. The moving object detection apparatus according to claim 2, further comprising
an output unit configured to perform image processing on at least one of the pictures received by the image input unit, such that each of moving object region classified into the same class by the moving object detection unit is displayed in a display mode different from a display mode of other moving object regions, and output the picture on which the image processing is performed.

11. The moving object detection apparatus according to claim 2, further comprising
a recording and transmitting unit configured to write or transmit a result of detecting a moving object performed by the moving object detection unit, into a recording device or to an external device via a transmission path, respectively.

12. The moving object detection apparatus according to claim 2, further comprising
a motion prediction unit configured to calculate, from among the trajectories which are identified by the moving object detection unit and included in the class, a representative trajectory that represents the class, and predict, according to the calculated representative trajectory, motion of the moving object by predicting that a region of the moving object corresponding to the class moves between the pictures.

13. The moving object detection apparatus according to claim 1,
wherein the inter-subclass similarity calculating unit is configured to calculate a similarity between the subclasses by repeatedly multiplying a matrix W in which each of elements indicates the trajectory share ratio between the subclasses, by a matrix Z in which each of the elements indicates the similarity between the subclasses, to update the matrix Z in which each of the elements indicates the similarity between the subclasses.

14. The moving object detection apparatus according to claim 13,
wherein the inter-subclass similarity calculating unit is further configured to calculate the similarity between the subclasses by weighting the updated matrix Z with a matrix Y in which each of the elements indicates a subclass reliability that is a value corresponding to the number of trajectories included in the subclass or a spatial size of a region including trajectories included in the subclass.

15. A method of detecting a moving object in video by performing segmentation to identify an entire or partial region of the moving object in the video, the method comprising:
receiving at least three pictures included in the video;
extracting, from among the at least three pictures, image subsets each including at least two of the pictures, and calculating, for each of the image subsets, trajectories each of which is a trajectory of motion of a block, between the pictures included in the image subset, the block including one or more pixels and being included in each of the pictures;
classifying, for each of the image subsets, the calculated trajectories into subclasses, the calculated trajectories being included in the image subset;
calculating a trajectory share ratio which indicates a degree of sharing a same trajectory between two of the subclasses, and calculating a similarity between the two of the subclasses based on the trajectory share ratio; and
detecting the moving object in the video by classifying the subclasses into classes such that the subclasses between which the calculated similarity is higher are more likely to be classified into the same class, to identify, as the region of a moving object, the blocks which correspond to the trajectories included in a same class.

16. A non-transitory computer-readable recording medium for use in a computer, the recording medium having a computer program recorded thereon for causing the computer to execute all of the steps included in the moving object detection method according to claim 15.

* * * * *